United States Patent
Nguyen et al.

(10) Patent No.: US 11,709,758 B2
(45) Date of Patent: Jul. 25, 2023

(54) ENHANCED APPLICATION PERFORMANCE FRAMEWORK

(71) Applicant: Accenture Global Solutions Limited, Dublin (IE)

(72) Inventors: Tri Phi Minh Nguyen, Pinellas Park, FL (US); Jagaran Das, Durgapur (IN); Sekhar A. Badugu, Bangalore (IN); Prudhvi Laxmi Narayana Chelluri, Pithapuram (IN); Prasun Chandra, Bengaluru (IN); Anuruddha S. Khastgir, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 137 days.

(21) Appl. No.: 17/360,472

(22) Filed: Jun. 28, 2021

(65) Prior Publication Data
US 2022/0413992 A1    Dec. 29, 2022

(51) Int. Cl.
*G06F 11/36* (2006.01)
*G06F 16/903* (2019.01)
(Continued)

(52) U.S. Cl.
CPC ............ *G06F 11/3616* (2013.01); *G06F 8/71* (2013.01); *G06F 9/455* (2013.01);
(Continued)

(58) Field of Classification Search
CPC ........ G06N 3/0481; G06N 5/04; G06F 30/20; G06F 11/3051; G06F 11/3404;
(Continued)

(56) References Cited

U.S. PATENT DOCUMENTS

2006/0074948 A1*  4/2006  Motoki ............... G06F 11/3409
2008/0133435 A1   6/2008  Chintalapti et al.
(Continued)

OTHER PUBLICATIONS

Extended Search Report in European Appln. No. 22180894.2, dated Nov. 22, 2022, 11 pages.
(Continued)

*Primary Examiner* — Tuan A Vu
(74) *Attorney, Agent, or Firm* — Fish & Richardson P.C.

(57) ABSTRACT

This document describes a framework for measuring and improving the performance of applications, such as distributed applications and web applications. In one aspect, a method includes performing a test on an application. The test includes executing the application on one or more computers and, while executing the application, simulating a set of workload scenarios for which performance of the application is measured during the test. While performing the test, a set of performance metrics that indicate performance of individual components involved in executing the application during the test is obtained. A knowledge graph is queried using the set of performance metrics. The knowledge graph links the individual components to corresponding performance metrics and defines a set of hotspot conditions that are each based on one or more of the corresponding performance metrics for the individual components. A given hotspot condition is detected based on the set of performance metrics.

20 Claims, 25 Drawing Sheets

(51) Int. Cl.
*G06F 16/901* (2019.01)
*G06F 8/71* (2018.01)
*G06N 5/04* (2023.01)
*G06F 9/455* (2018.01)

(52) U.S. Cl.
CPC ...... *G06F 11/3608* (2013.01); *G06F 11/3656* (2013.01); *G06F 11/3688* (2013.01); *G06F 16/9024* (2019.01); *G06F 16/90335* (2019.01); *G06N 5/04* (2013.01)

(58) Field of Classification Search
CPC ............. G06F 11/3409; G06F 11/3616; G06F 11/3688; G06F 16/90335; G06F 16/9024; G06F 8/71; G06F 11/3656; G06F 11/3608; G06F 9/455; H04L 41/0896; H04L 43/0858; H04L 41/5009
See application file for complete search history.

(56) References Cited

U.S. PATENT DOCUMENTS

| | | | | |
|---|---|---|---|---|
| 2012/0110162 | A1* | 5/2012 | Dubovik | H04L 41/0896 709/224 |
| 2013/0179144 | A1 | 7/2013 | Lu et al. | |
| 2014/0278337 | A1* | 9/2014 | Branson | G06F 11/3404 703/22 |
| 2015/0019707 | A1 | 1/2015 | Raghunathan et al. | |
| 2015/0220420 | A1 | 8/2015 | Boneti et al. | |
| 2018/0123918 | A1* | 5/2018 | Steinhauser | H04L 43/0858 |
| 2019/0286548 | A1* | 9/2019 | Chen | G06F 11/3051 |
| 2019/0370643 | A1* | 12/2019 | Aflalo | G06N 3/0481 |
| 2020/0026562 | A1* | 1/2020 | Bahramshahry | H04L 41/5009 |
| 2020/0257670 | A1 | 8/2020 | Masson et al. | |
| 2020/0342068 | A1* | 10/2020 | Cai | G06F 30/20 |
| 2020/0396232 | A1 | 12/2020 | Lee | |

OTHER PUBLICATIONS

Accenture.com [online], "Conversational AI makes human services more human," May 3, 2019, retrieved on Nov. 23, 2021, retrieved from URL<https://www.accenture.com/us-en/insights/public-service/conversational-ai>, 5 pages.

Apache.org [online], "Apache JMeter™," available on or before Nov. 12, 2011, via Internet Archive: Wayback Machine URL<https://web.archive.org/web/20111112100018/https://jmeter.apache.org/>, retrieved on Nov. 23, 2021, retrieved from URL<https://jmeter.apache.org/>, 2 pages.

Cooper et al., "Benchmarking Cloud Serving Systems with YCSB," Presented at Proceedings of SOCC '10: ACM SIGMOD-SIGOPS Workshop on Cloud Computing in conjunction with SIGMOD 2010, Indianapolis, IN, USA, Jun. 10-11, 2010; SoCC '10: Proceedings of the 1st ACM symposium on Cloud computing, Jun. 2010, 143-154.

Grafana.com [online], "Grafana Labs," available on or before Mar. 24, 2017, via Internet Archive: Wayback Machine URL<https://web.archive.org/web/20170324105918/https://grafana.com/>, retrieved on Nov. 23, 2021, retrieved from URL<https://grafana.com/>, 7 pages.

InfluxData.com [online], "InfluxData," available on or before Jan. 29. 2016. via Internet Archive: Wayback Machine URL<https://web.archive.org/web/20160129100017/https://www.influxdata.com/>, retrieved on Nov. 23, 2021, retrieved from URL<https://www.influxdata.com/>, 8 pages.

Linkedin.com [online], "Introducing ThirdEye: LinkedIn's Business-Wide Monitoring Platform," Jan. 9, 2019, retrieved on Apr. 2, 2021, retrieved from URL<https://engineering.linkedin.com/blog/2019/01/introducing-thirdeye--linkedins-business-wide-monitoring-platfor>, 8 pages.

Medium.com [online], "SRE: Knowledge Graphs: Increased Context in Human Involved Incident Response(IR)," May 29, 2019, retrieved on Apr. 2, 2021, retrieved from URL<https//medium.com/dm03514-tech-blog/sre-knowledge-graphs-increased-context-in-human-involved-incident-response-ir-301fd831070c>, 8 pages.

TPC.org [online], "TPC," available on or before Nov. 26, 1996, via Internet Archive: Wayback Machine URL<https://web.archive.org/web/19961126070110/http://www.tpc.org/>, retrieved on Nov. 23, 2021, retrieved from URL<http://tpc.org/>, 5 pages.

\* cited by examiner

Benchmark Setup:

| Field | Value |
|---|---|
| Base Directory | /home/pe/JBEAT-master |
| Min Heap Size | 10g |
| Max Heap Size | 25g |
| Workload Types | ⊙ Custom ○ Load ○ Stress ○ Soak ○ Spike ○ StepUP |
| Expected Peak Users | 100 |
| Scenarios | search_unconverted |
| No of Runs | 1,2 |
| Select file(s) to upload | Browser... No files selected. [Upload] |

Custom workload config:

| Field | Value | Notes |
|---|---|---|
| Execution Type | Iteration ▼ | |
| Concurrent Users (for Plain scenarios) | 1,2,4,10,20 | |
| Concurrent Users (for Mix scenarios) | 20,40 | |
| Rampup | 0.8s | |
| Duration | 5m | |
| No of Loops | 1 | |
| Mix scenario parameters | | Separate the parameters using ";" for different concurrencies. Format: (users,rampup,duration/loops). You can pass custom values for rampup and duration |
| Sleeptime before run | 10s | |
| Sleeptime after run | 3m | |
| Sleeptime between user set | 30s | |
| Sleeptime between scenarios | 30s | |
| CSV dataset details | all:userlist:/home/pe/JBEAT-master/iodata/max_files/userlist.csv;search_unconverted:/home/pe/JBET-master/iodata/jmx_files/search_unconverted_params.csv | |
| Required Network Bandwidth (in kbps) | | If not specified, it will be set to unlimited. Specify in kbps |

FIG. 5

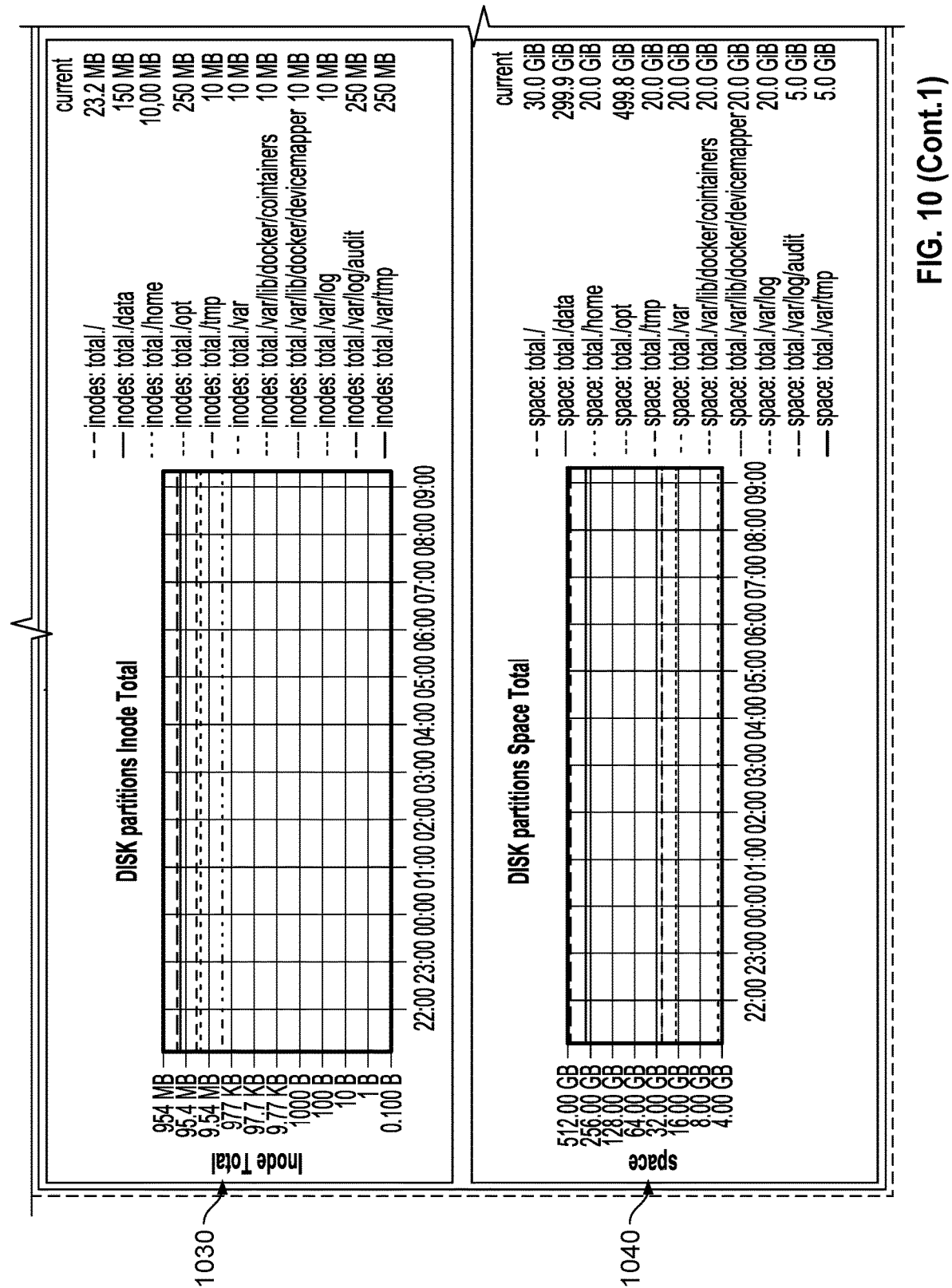
FIG. 10 (Cont.1)

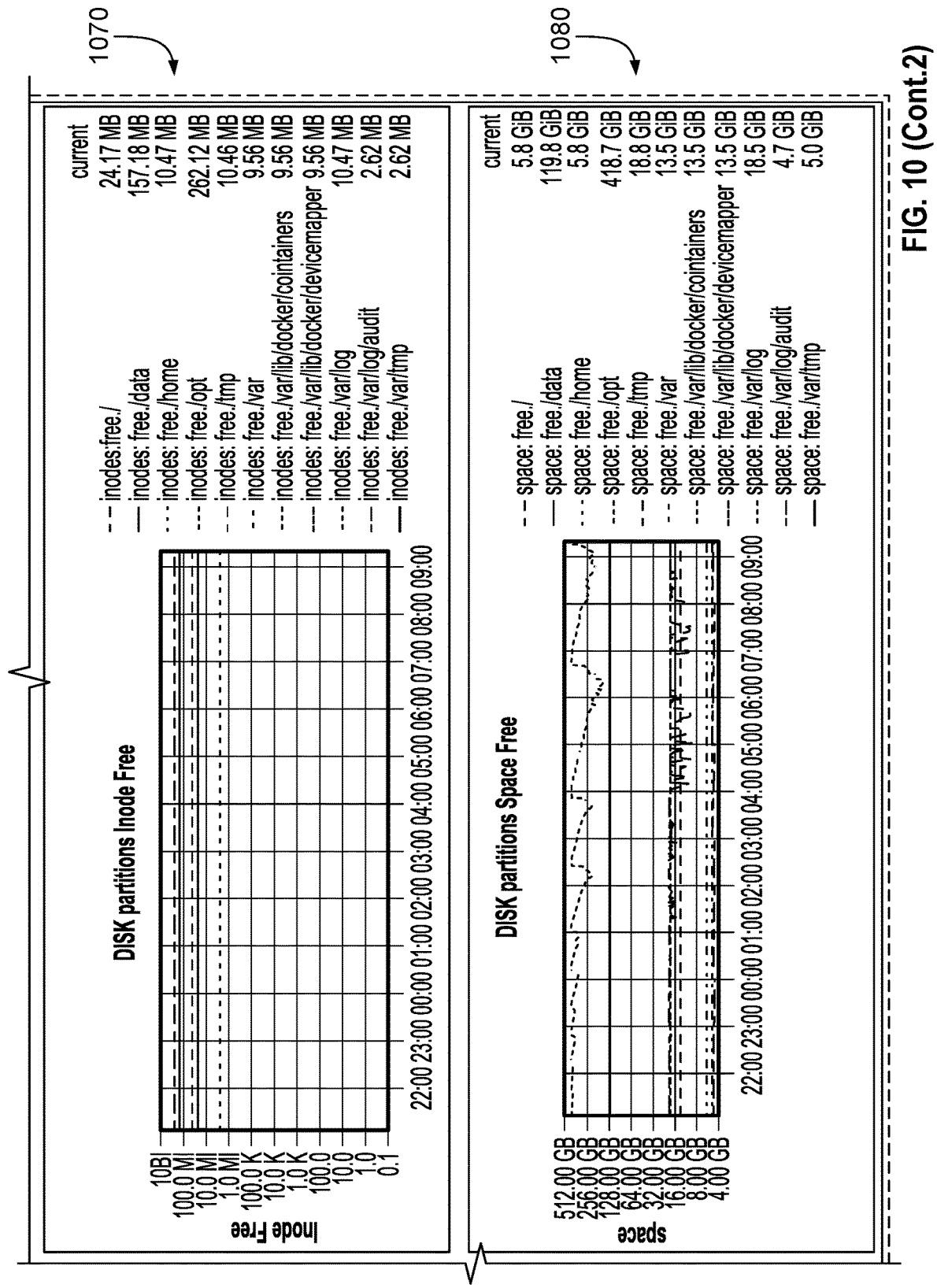
FIG. 10 (Cont.2)

ENHANCED APPLICATION PERFORMANCE FRAMEWORK

TECHNICAL FIELD

This specification relates to a framework for measuring and improving the performance of applications, such as distributed applications and web applications.

BACKGROUND

Various tools can be used to analyze the performance of applications. Such tools often simulate workloads, measure various performance metrics, and output performance data for analysis by application developers. Application developers can use the performance metrics to improve the performance of the application, e.g., by modifying code of the application or scaling up hardware resources used to execute the application.

SUMMARY

Performance benchmarking is an important phase of the development cycle of scalable web applications, distributed applications, and other types of applications. The integration of benchmarking activity into the development process can ensure the delivery of applications that satisfy initial defined expectations of high availability, high throughput, low latency, and other performance expectations or requirements. Early detection of bottlenecks in applications helps users, e.g., software developers of information technology (IT) professionals, quickly pinpoint inefficiencies in the design and implementation, and accordingly suggest and/or implement appropriate enhancements. These enhancements can include, for example, using appropriate data structures, improving data ingestion flow, reconfiguring current databases, and/or selecting more appropriate databases. The outcome of the benchmarking helps the users gain a better understanding of the scalability of the application and therefore provides more accurate sizing/scaling recommendations to the users.

The framework described in this document includes a wide range of capabilities that ensure better performing applications and provides a transparent and complete application benchmarking solution. The framework, which can include hardware and software components, can employ automated processes that allow users to design complex benchmarking scenarios with less effort and fewer errors. This is particularly useful in service or software development since the deliverable involves many cycles of phases from designing, developing, evaluating, to deploying. Using the automated processes alleviates the need for developers to waste time writing benchmarking execution scripts and makes it unnecessary to update such sophisticated script whenever a codebase (e.g., code of the application) changes, thereby reducing errors that may otherwise be introduced into the benchmarking execution scripts.

The framework also provides full-stack observability that enables continuous detection of causal relationships between performance metrics of applications. This is particularly advantageous as applications in increasingly complex and highly dynamic environments have more dependencies than developers can effectively or practically analyze with traditional monitoring tools. The framework's monitoring and reporting features can provide real-time observability during benchmarking, can collect reliable and consistent performance data points to generate reports that enable bottleneck detection and provide insights into the behavior of the application.

The framework can simulate different types of workloads, e.g., both linear and non-linear, to perform various benchmarks, such as load, stress, spike, endurance, and scalability testing. These tests help application developers to identify potential hotspot conditions ("hotspots") and application thresholds in terms of concurrency, response time, and resource utilization. In addition, the framework can simulate different network bandwidths during benchmarking to allow the application developer to understand how network settings affect the service-level agreement (SLA) of a service. Upon completion of the benchmarking, the framework can provide an overall performance score for benchmarked applications by weighting various performance metrics and comparing them against thresholds or industry standards to arrive at an appropriate and accurate overall score.

The framework can also analyze performance results (e.g., performance metrics), detect bottlenecks, and automatically scale up clusters if bottlenecks related to hardware specification metrics are detected. These metrics can be, for example, the number of central processing unit (CPU) cores, the amount of utilized memory, the utilization of disk space, and so on. For example, after benchmarking workload A in a Kubernetes™ environment K, the framework can detect, based on the analysis of the performance metrics generated during the benchmarking, that the memory utilization of a specific pod P exceeds a specified threshold. In response, the framework can execute Kubernetes™ commands to either allocate more memory to pod P or add more physical instances of the Kubernetes™ environment K, and re-execute the benchmarking. The framework can continue to scale up pod P/environment K and re-execute the benchmarking until workload A completes without any detected bottlenecks. This feature helps the application developer to record exact required hardware specification to meet a target SLA.

The framework can use a knowledge graph to provide proactive hotspot detection, e.g. for registered monitored services. This enables the recognition of issues, e.g., hotspots or bottlenecks, faster thereby enabling faster issue resolution and fewer errors. The knowledge graphs can be developed and/or maintained by domain experts. A knowledge graph can contain a graph-based representation of a service's hotspots and corresponding recommendations for mitigating issues. With performance metrics being continuously collected, the framework can query the knowledge graph to detect hotspots and suggest and/or implement actions to mitigate the hotspots. The framework can execute the recommended actions, e.g., in registered services, and report the status back to application developers and/or other users.

The framework has a rich feature set that includes validating benchmark configuration, server settings, and providing suggestions to correct misconfigurations. The feature set also includes, in situations in which a benchmark scenario replays multiple times, the framework dynamically selects the most appropriate result based upon benchmark metrics of response time, accuracy, and error rate. The feature set can also include a built-in visualization module that produces various performance graphs to compare outcome of different benchmark settings and a user-friendly interface that makes it easy for developers to configure, control, and monitor benchmarks. The feature set can also include a quick and easy, e.g., one-click, deployment that speeds up deployment time which, in turn, reduces overhead of preparation tasks. In addition, the framework has unique implementations of a logging facility that captures and analyzes errors and execution logs among benchmarks, a notification module to communicate with application developers during long run benchmarks, and a data generator integration that creates datasets used for domain-specific benchmark suites. The framework is organized into modular components to conveniently integrate with plugins and enables reusability among different users' environments.

In general, one innovative aspect of the subject matter described in this specification can be embodied in methods that include the actions of performing a test on an application. The test includes executing the application on one or more computers and, while executing the application, simulating a set of workload scenarios for which performance of the application is measured during the test. While performing the test, a set of performance metrics that indicate performance of individual components involved in executing the application during the test is obtained. The individual components include the application, one or more services utilized by the application, and underlying computing resources on which the application and one or more services are executed. A knowledge graph is queried using the set of performance metrics. The knowledge graph links the individual components to corresponding performance metrics and defines a set of hotspot conditions that are each based on one or more of the corresponding performance metrics for the individual components. In response to the querying, a given hotspot condition that has been detected based on the set of performance metrics is identified. An action that reconfigures one or more the individual components based on the given hotspot is initiated.

The foregoing and other embodiments can each optionally include one or more of the following features, alone or in combination. In some aspects, initiating the action that reconfigures the one or more individual components based on the given hotspot includes generating a recommendation indicating a recommended action for a given individual component and sending the recommendation to a platform that manages the given individual component, wherein the platform adjusts a configuration of the individual component based on the recommended action and maintains the adjusted configuration after the test is completed.

In some aspects, the given individual component is the application and the recommended action comprises an adjustment to code of the application. In some aspects, the given individual component comprises an underlying computing resource on which the application or a service used by the application is executed and the recommended action comprises scaling up or scaling down the underlying computing resource for executing the application or the service. Some implementations includes continuing performing the test using the reconfigured one or more individual components.

In some aspects, the knowledge graph links each hotspot condition to one or more recommended actions for responding to the hotspot condition. Initiating the action can include querying, using the given hotspot condition, the knowledge graph for a given recommended action linked to the given hotspot condition, receiving, in response to the querying, the given recommended action, and initiating, as the action that reconfigures the one or more individual components, the given recommended action.

In some aspects, performing the test includes simulating linear and non-linear workloads. Performing the test can include adjusting a bandwidth of a network connection between client devices and the application during the test.

In some aspects, the action reconfigures a software component of the individual components. Aspects can include determining that the hotspot condition remains active after performing the action, identifying a second action that reconfigures a hardware component based on the hotspot condition, and initiating the second action. The second action can include increasing a quantity or capacity of the hardware component. Some implementations can include updating, while performing the test, one or more user interfaces that display at least a subset of the set of performance metrics.

Some aspects can include determining respective performance scores for multiple individual components involved in executing the application during performance of the test. The performance score for each individual component can be based on one or more key performance indicators measured for the individual component during the test. These aspects can include adjusting a configuration of at least a portion of the individual components based on the respective performance scores for the portion of the individual components. These aspects can include determining an overall performance score for the application based on the respective performance scores for the individual components. Adjusting the configuration of at least a portion of the individual components based on the respective performance scores for the portion of the individual components can include adjusting the configuration of a given individual component until the respective performance score for the given individual component reaches a specified threshold.

The subject matter described in this specification can be implemented in particular embodiments and may result in one or more of the following advantages. The application performance framework can execute benchmarking scenarios on an application and its runtime environment including the underlying computing system, analyze results of the benchmarking, detect bottlenecks and hotspots in the application and/or underlying system, and recommend or perform actions to improve the performance and/or remove bottlenecks and/or hotspots, thereby improving the performance of the application, reducing errors that occur during execution of the application, and improving the efficiency of the underlying computing system that executes the application. The framework can include an easy to use user interface that enables an application developer or other user to configure benchmarking scenarios (e.g., a set of tasks to be performed, performance indicators to be measured, increases in workload, and/or the number of times the benchmarking is to be run) rather than requiring a user to generate benchmarking execution scripts or other code that defines these parameters, which reduces errors in the benchmarking due to faulty code, reduces the occurrence of non-executable scripts that would prevent the benchmarking from executing, and simplifies the benchmarking process.

During the benchmarking of an application, the framework can dynamically adjust the workload and parameters, e.g., the bandwidth of devices submitting requests or loading pages, that may affect the performance of the application to evaluate the metrics under various conditions. While making these dynamic adjustments, the framework can query a data structure, e.g., knowledge graph, using performance metrics to identify and make adjustments to the configuration of the application and/or to the underlying hardware to both determine how the application performs with changing workloads and configurations and to arrive at an application and/or hardware configuration that performs well given the workload and other conditions. These dynamic adjustments enable the framework to account for many different conditions that could negatively affect the performance of an application and make the appropriate adjustments to the application and underlying hardware.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an application performance framework that performs dynamic tests on applications, measures the performance of the applications based on the tests, detects bottlenecks and hotspot conditions in the application and/or underlying computing resources on which the applications execute, and takes action, e.g., corrective actions, to improve the performance of the applications based on the results of the dynamic tests.

In general, hotspot conditions and bottlenecks are performance conditions associated with one or more hardware and/or software components that degrade the overall performance of the application. A hotspot condition can be a performance condition in which a component is overloaded. Example hotspot conditions include a CPU utilization that is above a threshold (e.g., greater than 80%, 90%, 95% or another appropriate threshold). Such conditions can be symptoms of known or unknown issues within the overall system. A bottleneck can be a condition that reduces the performance of other components and where tuning can improve the overall performance of the system. Example bottlenecks include low network input/output (I/O) bandwidth, e.g., the number of packets transmitted per second or the number of read/write bytes per second).

Figure 1:
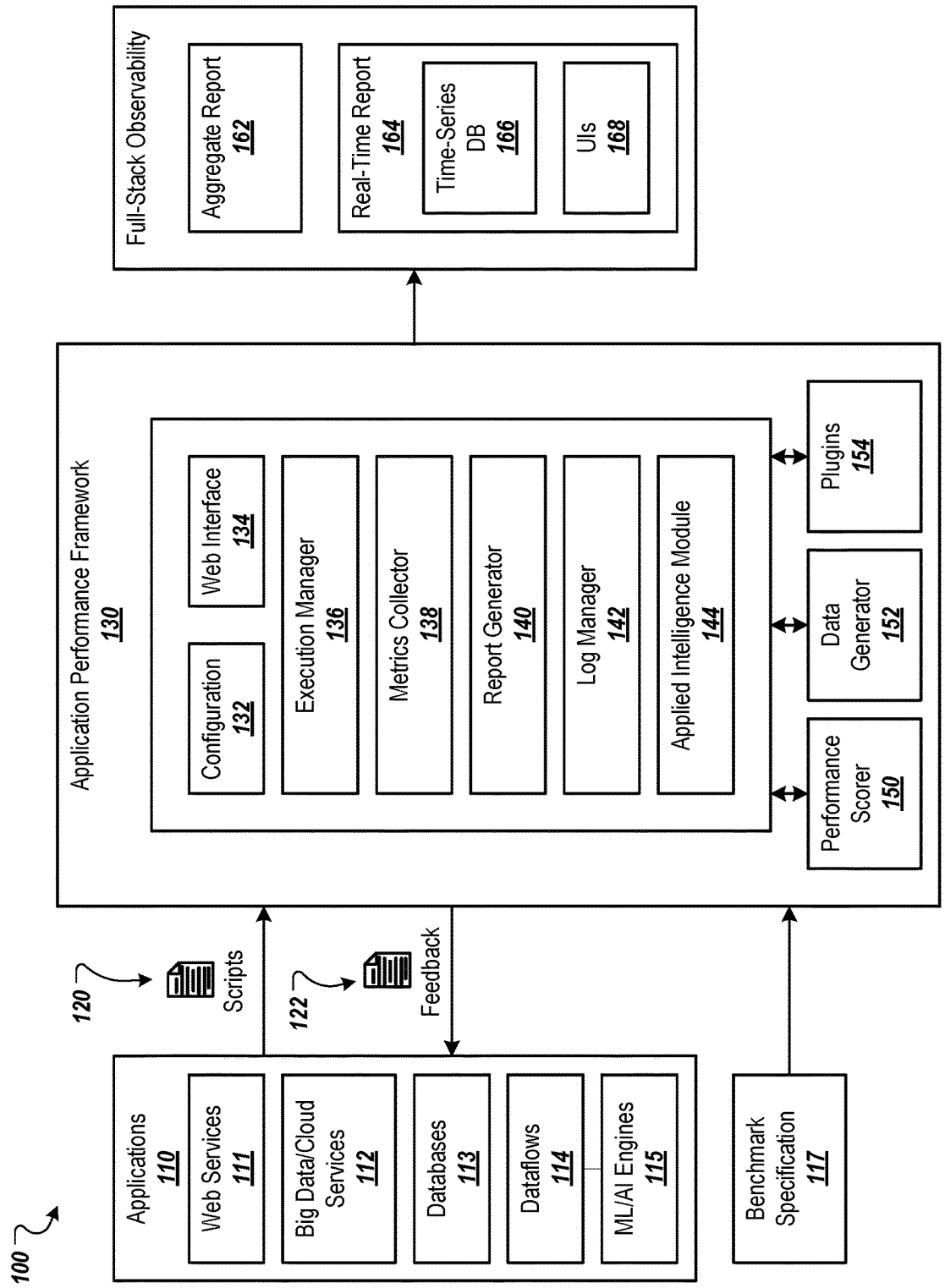
FIG. 1 is an example of an environment in which an application performance framework measures the performance of applications and performs actions that improve the performance of the applications.

FIG. 1 is an example of an environment 100 in which an application performance framework 130 measures the performance of applications and performs actions that improve the performance of the applications. The application performance framework 130, which is also referred to as the framework 130, can perform benchmarking processes to measure the performance of various types of applications 110 running in different types of runtime environments, including in various types of cloud platforms. The applications 110 can include, for example, web services 111, big data/cloud services 112, different types of databases 113, production dataflows 114, machine learning/artificial intelligence engines 115, and distributed applications. These applications 110 are just some example applications and the framework 130 can perform benchmarking processes on other types of applications as well. The framework 130 can benchmark a distributed application that includes multiple applications or services that run on one or more computing platforms and communicate with each other over a network. The framework 130 can include software tools running on one or more computers.

The framework 130 can be installed on a computing platform, e.g., a local computing platform or a cloud computing platform, using a one-click deployment process. In such a process, the framework 130 can configure itself based on the platform on which it is being installed in response to a single user command, e.g., user interaction with an install icon.

Figure 5:
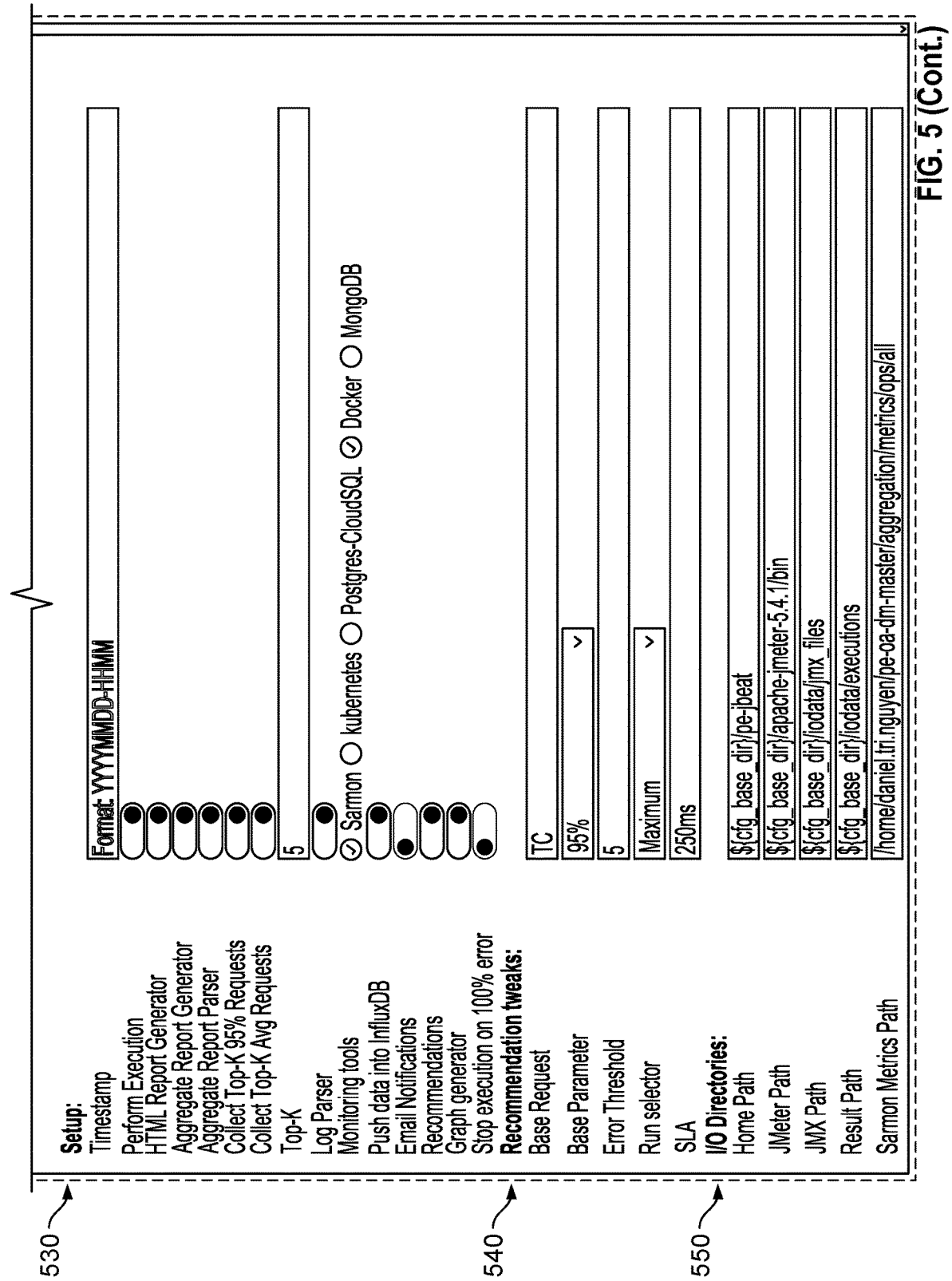
FIG. 5 shows an example user interface for submitting settings for benchmarking an application.

The framework 130 can receive, as inputs, benchmarking execution scripts 120 (or other benchmarking configuration code) and benchmarking specifications 117. The benchmarking specifications 117 can include specifications provided by an application developer or other user, e.g., via a user interface such as a web interface 134. An example interface for providing benchmarking specifications 117 is shown in FIG. 5 and described below. The web interface 134 can also be used to provide the results of tests performed on an application, e.g., in real-time as the tests are performed and/or after the tests are completed.

A configuration engine 132 can generate and/or the interface and receive the benchmarking specifications 117 that are entered into the interface. The benchmarking specifications 117 include parameters related to the tests that are to be performed on the application. The benchmarking specifications 117 can include, for example, a list of scenarios to be benchmarked, benchmarking settings (e.g., benchmarking approaches, number of concurrent users of the application, numbers of times execution of the benchmarking process is executed, a waiting time between successive benchmarking processes, and looping conditions for stressing applications), the type of generated reports and their content, settings for connecting to databases, integrated plugins, e-mail notification settings, and/or other appropriate parameters.

The list of scenarios can include various scenarios for which the application is to be tested and for which the performance of the application is to be measured. For example, one scenario can be a particular number of users submitting requests to an application from one or more geographic regions. In this scenario, the response time for the requests can be measured, the utilization of hardware resources can be measured, and the access time of a database that stores data used to respond to the requests can be measured. A list of scenarios can include ramping up or ramping down a number of requests or a number of users signed into or subscribed to a service. Each scenario can be for a particular number of users or particular number of requests. In other examples, the scenarios can include a minimum number of users and a maximum number of users and the application performance framework 130 can ramp up and down dynamically within those numbers of users.

In some implementations, benchmarking execution scripts 120 can be used to provide the list of scenarios and/or other benchmarking settings. The benchmarking execution scripts 120 can include detailed business steps needed to be followed in benchmark scenario. For example, if the framework 130 is going to benchmark a banking mobile app, the benchmarking execution scripts 120 would contain the following steps in chronological order: a) launch the app; b) log into the app; c) check account balance. A benchmarking execution script 120 can be specific to particular application. The benchmarking execution script 120 can be generated using a plugin based on the business function of the application.

The framework 130 includes an execution manager 136. The execution manager 136 can include the logic for validating, scheduling, and executing benchmarking settings defined in the configuration phase described above. The execution manager 136 can manage the execution of the scenarios and tests performed on an application. To do so, the execution manager 136 can coordinate with the other components of the framework 130, such as a metrics collector 138, a report generator 140, a log manager 142, and an applied intelligence module 144.

In some implementations, the execution manager 136 uses benchmarking scripts to manage the execution of the scenarios and tests to be performed. These scripts can interpret benchmarking specifications provided using the user interfaces, e.g., the number of users that concurrently access the application, the number of times the benchmark should repeat steps defined in benchmarking execution script, the duration of each round of benchmark, the types of reports needed to be generated, etc. The benchmarking scripts can control the execution of the benchmarking and can coordinate with almost all other components of the framework 130.

The execution manager 136 can receive the benchmarking specifications 117 and perform the tests on the application based on the benchmarking specifications 117. For example, if a scenario of the benchmarking specifications 117 is for a particular number of users to perform an action (e.g., submit a request) with respect to the application, the execution manager 136 can simulate the actions, e.g., by simulating a client device initiating the action, during the benchmarking process.

The metrics collector 138 collects, e.g., continuously during the benchmarking process, performance metrics for the application being tested and for related resources, e.g., computing resources of the platform on which the application is executing. The performance metrics can include, for example, the response time for the application to respond to a request, the number of requests processed per unit time, the duration of time to perform an action, the utilization of each computing resources, the response time/rate of databases, the size of a Memtable, the number of errors that have occurred for a component of the application or the underlying resources, etc. The metrics collector 138 can instantly process each performance metric and store the metrics in a time series database that is used to generate monitoring user interfaces, such as the user interfaces of FIGS. 6 and 7, to generate alerts, and to determine/initiate actions for configuring the application or underlying resources or otherwise improving the performance of the application.

The report generator 140 generates reports and user interfaces related to the performance of the application that is tested. The report generator 140 can use interactive dashboard templates to generate graphs that display performance metrics across the components of the application and underlying resources in real-time. The report generator 140 can be configured to slice data by particular fields or compute customized metrics specified by a user. The reports and user interfaces generated by the report generator 140 enable users to view performance overviews, measured metrics side-by-side for total visibility, follow data to other parts of the applications without losing context, and explore infrastructure, logs, and network performance together for complete observability of the full stack. The report generator 140 can also include user interface tools that enables users to quickly configure new, customizable dashboards to best meet the users' performance monitoring needs. The report generator 140 can generate reports in various formats, including, for example, Hyper Text Markup Language (HTML), Comma-Separated Values, and PNG. The report generator 140 can help identify the actual root cause of performance issues of an application. For example, reports and user interfaces generated by the report generator 140 can show metrics in a way that helps users identify the root cause of performance issues. The reports and user interfaces can depict spikes in resource utilization that can be used to diagnose the root cause of performance issues. For example, if the disk utilization reaches 99%, the user interface that shows the disk utilization would include a spike relative to the baseline utilization, which would enable a user to quickly determine that the root cause of the malfunction of an application is a disk full issue.

The report generator 140 can generate and/or update (e.g., by providing updated data for) user interfaces displayed on client devices of the users. The report generator 140 can also transmit reports to the client devices, e.g., via e-mail.

The log manager 142 provides deeper visibility into progress of on-going benchmarks. The log manager 142 can notify users of severe incidents (e.g., the application is not responding, network blocking communications, etc.) that have occurred on the application side, resulting in a scheduled benchmark being stopped. The log manager 142 can monitor the application and underlying resources for particular types of events and notify users, e.g., using alerts, in response to detecting one of the events.

The applied intelligence module 144 uses a data structure, e.g., a knowledge graph, that represents the baseline performance of an application (which can be a distributed application that includes multiple services), the behavior of the components of the application and underlying resources, and recommended actions for responding to conditions, e.g., for mitigating issues. In coordination with the real-time metrics collector 138, the applied intelligence module 144 can automatically detect when things are not behaving as expected, can recommend and/or apply recommended actions to respond to conditions of the applications and/or underlying resources, and finally notify users of the conditions/actions.

As described in more detail below, a knowledge graph maintained by the applied intelligence module 144 can define the relationships between the components of an application, the computing resources in which the application is executed, performance metrics of the components, and recommended actions to take based on the performance metrics. The applied intelligence module 144 can query the knowledge graph using performance metrics determined during the benchmarking process and obtain, based on the performance metrics, recommended actions, e.g., when one or more of the performance metrics satisfy respective thresholds or other conditions. The recommended actions can include configurations to the application and/or the computing resources to improve the performance of the application. The framework 130 can provide feedback 122 to the application (or the platform executing the application) during the benchmarking to improve the performance of the application. The feedback 122 can include the recommendation action. By providing the recommended action during the benchmarking process, the platform can reconfigure the application and benchmark the reconfigured application in real-time without requiring user intervention or user reconfiguration of the benchmarking settings.

The framework 130 includes a performance scorer 150 that determines one or more performance scores for the application, components (e.g., services) of the application, the underlying resources on which the application executes, and/or the overall system. The performance scorer 150 can determine the scores based on the tests performed during benchmarking and the performance metrics obtained based on those tests.

For a given stack $S=\{C_1, C_2, \ldots, C_n\}$, where $C_i$ is a computing unit (such as a cloud managed service) that is part of the stack. For each $C_i \in S$, there are defined key performance indicators (KPIs) or features that help evaluate the performance score of $C_i$. Therefore, each compute unit $C_i$ can be viewed as tuples of KPIs that define its performance. For example, $C_1=\{x_1, x_2, \ldots, x_n\}$, $C_2=\{x_1, x_2, \ldots, x_m\}$, $C_i=\{x_1, x_2, \ldots, x_k\}$ and so on, where $x_1, x_2, \ldots, x_k$ are KPIs (e.g., $x_1$=query response time, $x_2$=concurrency level, $x_3$=disk read bytes/s, $x_4$=disk write bytes/s and so on). The number of KPIs for each computing unit $C_i$ may be the same or different, e.g., depending on the types of the computing units and their associated metrics.

For each compute unit $C_i$, the KPIs can have different units and be in different ranges. To calculate the performance score for a compute unit $C_i$, the performance scorer 150 can rescale/normalize these values to the range of [0,1] by using, for example, min-max scaling or min-max normalization. For each compute unit $C_i$, there are KPIs/features that can be represented as: $C_i=\{X_1, X_2, \ldots, X_n\}$, where $X_i$ is normalized. The performance scorer 150 can perform the normalization based on the service level agreements (SLAs) for corresponding KPIs/features if provided by the user. In some implementations, the performance scorer 150 can perform the normalization in two ways depending on the types of KPIs: the lesser values are preferred for KPIs such as response time; the higher values are preferred for KPIs such as throughput.

The performance scorer 150 can compute the performance score for each compute unit $C_i$ based on the corresponding KPIs associated with each compute unit $C_i$. The performance scorer 150 can also compute an overall performance score of the stack S based on the individual performance scores of compute units $C_i$ in stack S. The overall performance score can be an aggregation of the individual performance scores, e.g., an average or weighted average of the individual performance scores. If a weighted average is used, each individual performance score can be weighted based on the relative importance of the individual performance score.

The performance scorer 150 can tune the performance scores. For each compute unit $C_i$, the performance scorer 150 can maintain a standard (e.g., ideal or preferred) benchmark score which can be referred to as an Industry Standard reference score (in short, $C_i\_Score_{IS}$). For each score $C_i\_Score_{IS}$, the performance scorer 150 computes a corresponding standard deviation $\sigma_{C_i\_Score_{IS}}$ based on KPIs of the compute unit $C_i$ and correlations between the KPIs.

For a given stack $S_{new}=\{C'_1, C'_2, \ldots, C'_n\}$ in a new environment to be tested, the performance scorer 150 uses Industry Standard (IS) scores ($C_i\_Score_{IS}$ and $\sigma_{C_i\_Score_{IS}}$) as its references to each $C_i$ in stack $S_{new}$. These are the parameters (e.g., KPIs) against which the $S_{new}$ scores are weighed. After the stack $S_{new}$ is benchmarked, the performance scorer 150 has scores: $C'_1\_Score_{new}$, $C'_2\_Score_{new}$, ..., $C'_n\_Score_{new}$ for the compute units $C_i$. The performance scorer 150 tunes each compute unit until the following condition is satisfied: $|C_i\_Score_{IS} - C'_i\_Score_{new}| < k \cdot \sigma_{C_i\_Score_{IS}}$, where $i=[1 \ldots n]$, $k \leq 2$. This tuning can be performed by the applied intelligence module 144 during the benchmarking process in order to improve the performance score for each compute unit $C_i$ in the stack $S_{new}$, and therefore arrive at a better performing application defined by the stack $S_{new}$. After achieving the best possible (or satisfactory, e.g., above a threshold) score for each individual compute unit in a stack, the performance scorer 150 computes the overall stack's score, which can be represented as $S\_Score_{new}$. $S\_Score_{new}$ represents the overall performance of the benchmarked stack $S_{new}$.

The framework 130 integrates with one or more external data generators 152, such as Cloud Serving Benchmark (YCSB) and Transaction Processing Performance Council (TPC). Each benchmark suite has its own data generator 152 that generates data with unique characteristics. Benchmark suites use a generated dataset as the primary input. The framework 130 can integrate with external data generators 152 and trigger benchmark suites to measure performance of dedicated systems. For example, the framework 130 can provide, to the external data generators 152, measured performance metrics for an application being benchmarked and received, from the external data generators, performance indicators, e.g., performance score for the application and its components, e.g., its individual compute units.

The framework 130 can also integrate with plugins 154 to enrich collected performance metrics, e.g., utilization metrics. For example, the framework 130 can integrate with plugins 154 of external cloud computing providers or platforms, or other entities, such as Kubernetes™, CloudSQL, Docker™, and Sar. The framework 130 can obtain, from the plugins, performance data and/or other data related to the components that run on the platforms that include the plugins. For example, if the application being benchmarked runs in a Kubernetes™ cluster, the framework 130 can integrate with the Kubernetes™ plugin to obtain performance metrics for the application, performance metrics for the resources of the Kubrnete's platform, or other Kubernetes™ data that can be used to enrich the performance metrics computed by the metrics collector 138.

Some example metrics that can be obtained using the plugins 154 include system-level metrics (e.g., the utilization of CPUs, memory, and disk, input/output (IO) wait times), such metrics at the node, pod, and/or container levels, cluster info for container applications that run in clusters (e.g., configured requests and limits for the cluster), database-level metrics (e.g., top-k slowest queries, database stats, cache ratios, tuples, and deadlocks), response times, private bytes, function count, API-level response times, error counts, network IO, IO operations/unit time, disk IO percentage, sessions percentage, database transaction unit (DTU) utilization, database connections, active threads, operation counters, and database table locks.

The metrics collector 138 can collect the metrics and other data from the plugins 154 during and/or after the benchmarking process. The metrics collected from the plugins 154 can be used in a similar manner as those determined by the metrics collector 138. The performance scorer 150 can use these metrics to compute the performance scores described above. Similarly, the applied intelligence module 144 can use the metrics to identify actions to perform to address conditions identified during the benchmarking process, e.g., by identifying bottlenecks and/or hot spots based on the metrics.

The framework 130 provides full-stack observability during and after the benchmarking process. This full-stack observability includes an aggregated report 162 for the benchmarking of an application. The aggregate report 162 can include performance metrics determined during the benchmarking and at various levels, such as the node level, the pod level, the container level, and the component level. The aggregate report 162 can be displayed within a user interface (e.g., a dashboard interface) or transmitted to client devices in the form of a file that can be accessed at the client devices. The framework 130 can generate an aggregate report for an application after the benchmarking process is completed for the application.

Figure 6:
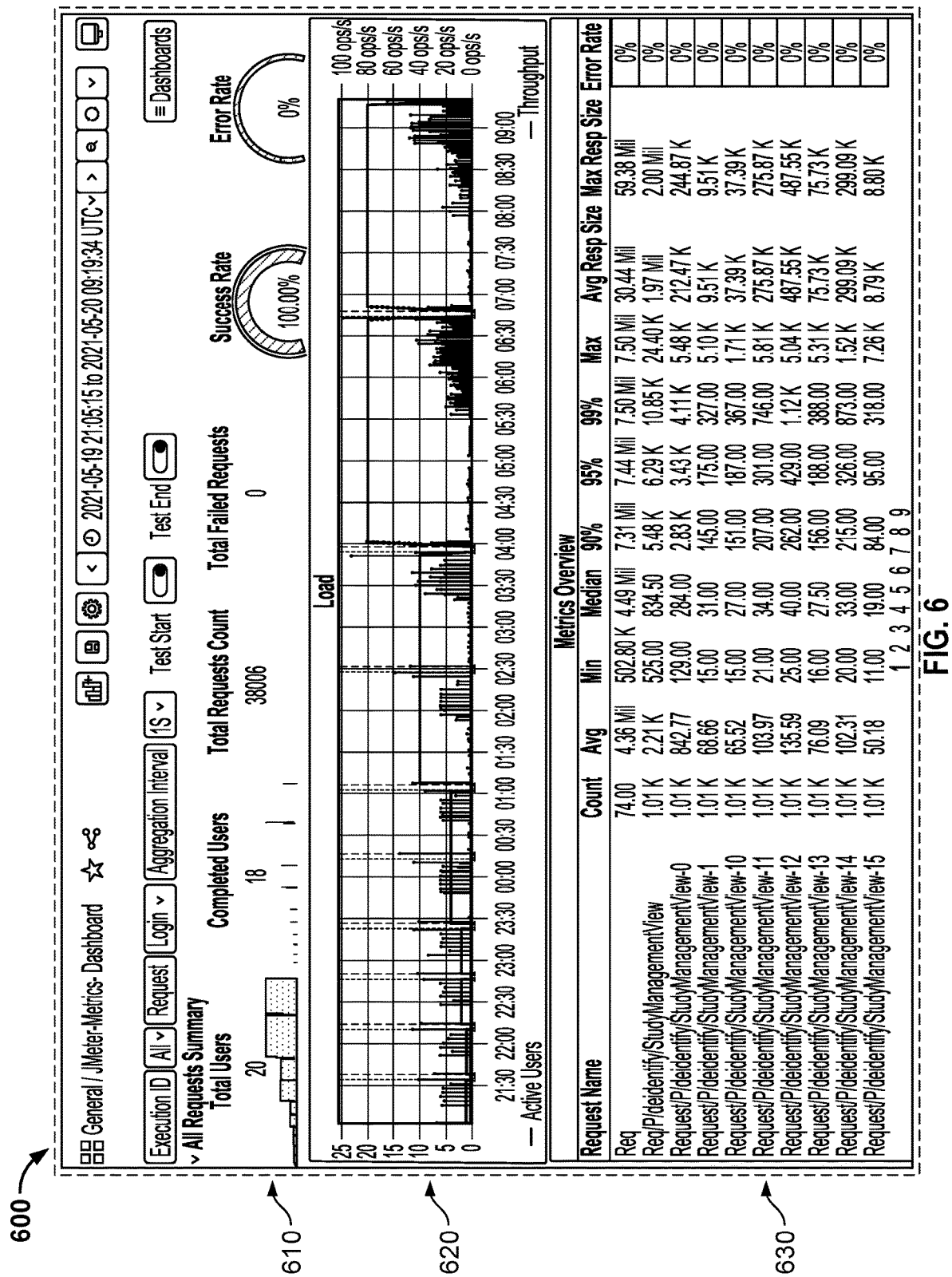
FIG. 6 shows an example dashboard user interface that displays performance metrics generated during the benchmarking of an application.
Figure 7:
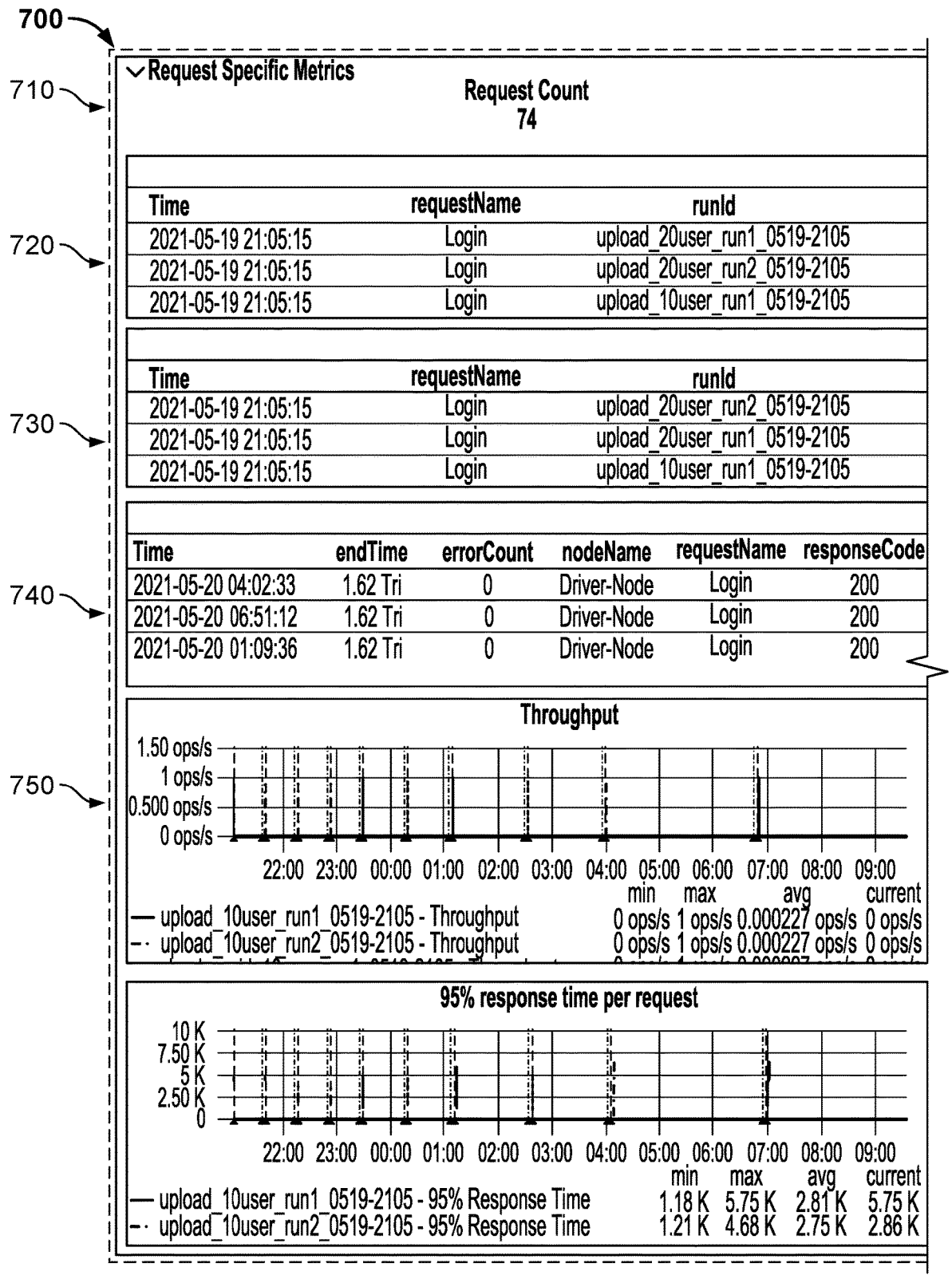
FIG. 7 shows an example dashboard user interface that displays performance metrics generated during the benchmarking of an application.
Figure 7:
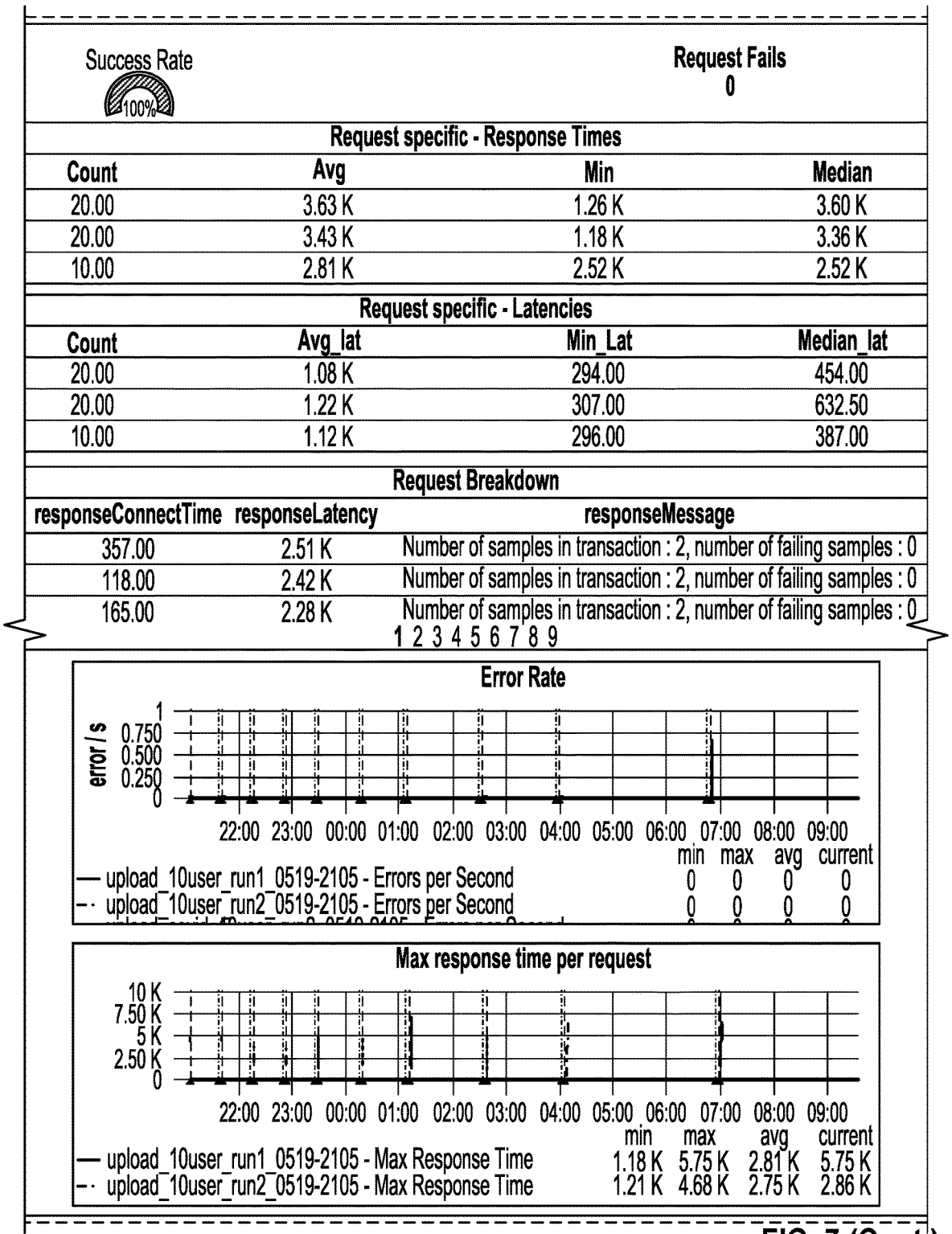
Figure 7:
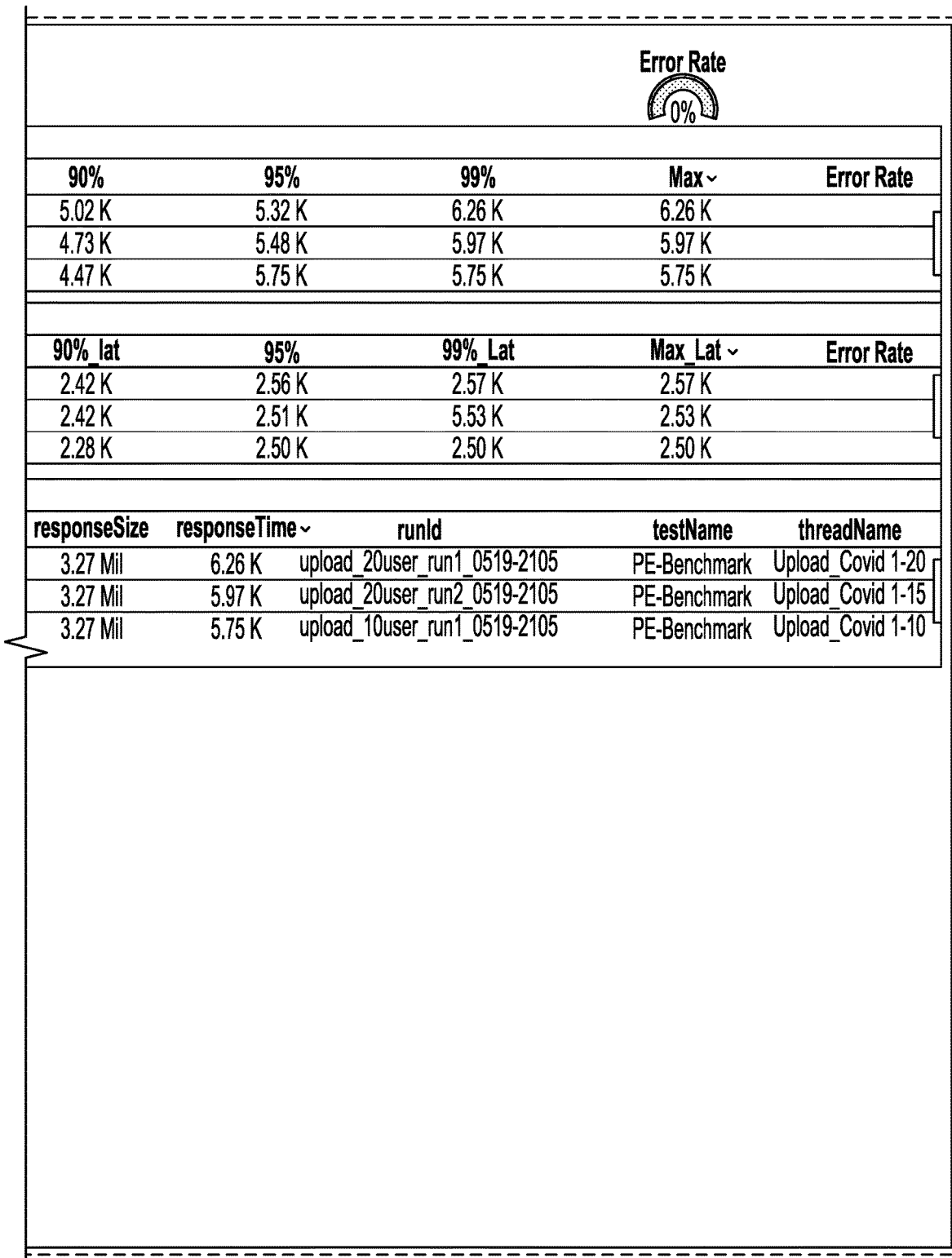

The full-stack observability also includes real-time reporting 164. The real-time reporting 164 can include a time-series database 166 and user interfaces 168 that display real-time performance metrics determined during the benchmarking process. Some example user interfaces are shown in FIGS. 6 and 7. The time-series database 166 includes time-series data, e.g., performance metrics, collected during the benchmarking process. Such data can be used in generating the user interfaces 168 and the aggregate report 162.

The full-stack observability enables continuous detection of causal relationships between performance metrics of applications. The time-series database 166 enables the instant replay of application problems within the framework 130, which allows a user to watch in detail how various components of the environment were affected over time. In addition, the reporting features of the framework 130 can include a built-in Python application for visually comparing the outcome of difference benchmark settings, an HMTL report generator that generates a detailed graphical report with different metrics for a benchmarking process in HTML format, a response-time summary report that contains different response times for the benchmarking process, a log parser that processes the execution logs and extracts execution timestamps, a resource utilization collector that collects the resource utilization for the executed timestamps, and smart reporting that notifies users in case of any errors during the benchmarking process and generates graphs at the end of the benchmarking process.

Figure 2:
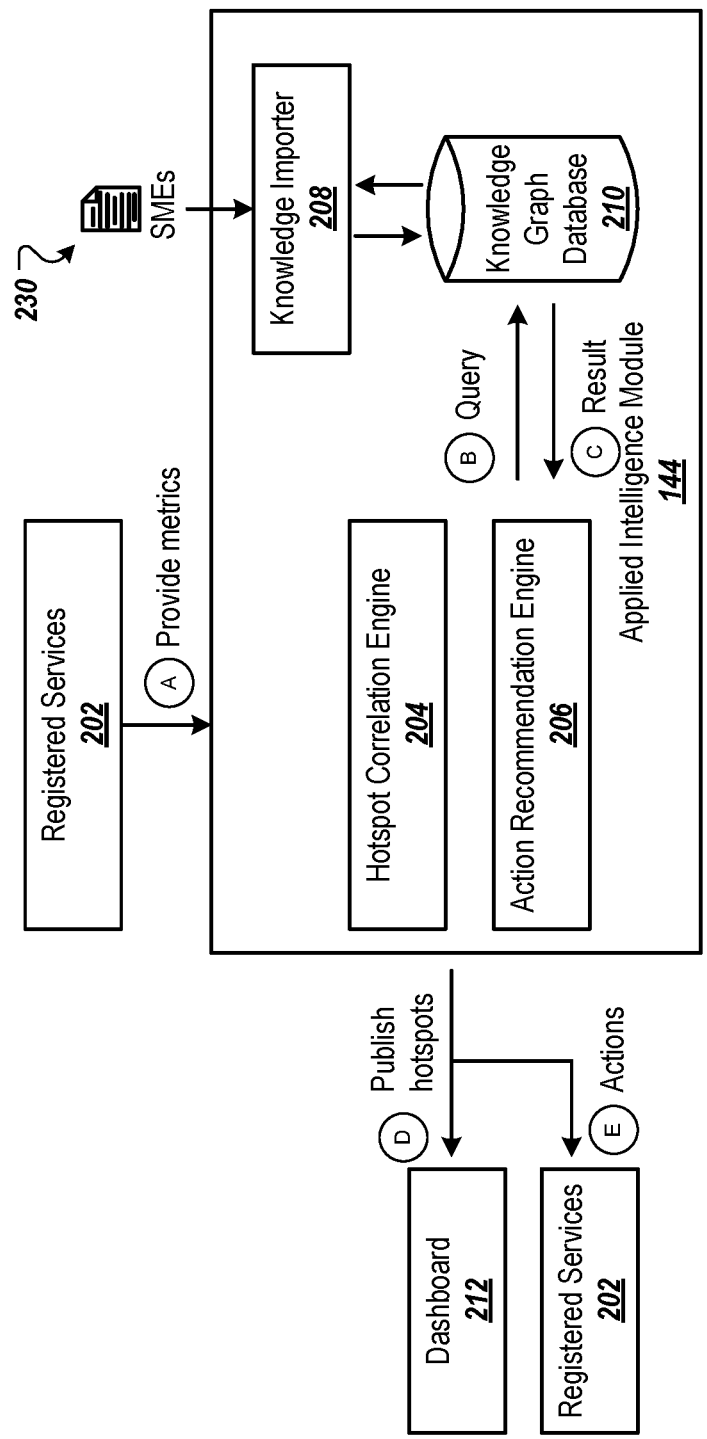
FIG. 2 shows the applied intelligence module of FIG. 1 in more details.

FIG. 2 shows the applied intelligence module 144 of FIG. 1 in more details. The application intelligence module 144 includes a hotspot correlation engine 204, an action recommendation engine 206, a knowledge importer 208, and a knowledge graph database 210.

The applied intelligence module 144 can use knowledge graphs to represent the relationships between components of an application (e.g., the various services used by the application), the computing resources of the platform(s) on which the application and services execute, the performance metrics for these components, the definitions of hotspots, and recommended actions to mitigate each hotspot. The applied intelligence module 144 can store and maintain the knowledge graphs in a knowledge graph database 210.

Figure 3:
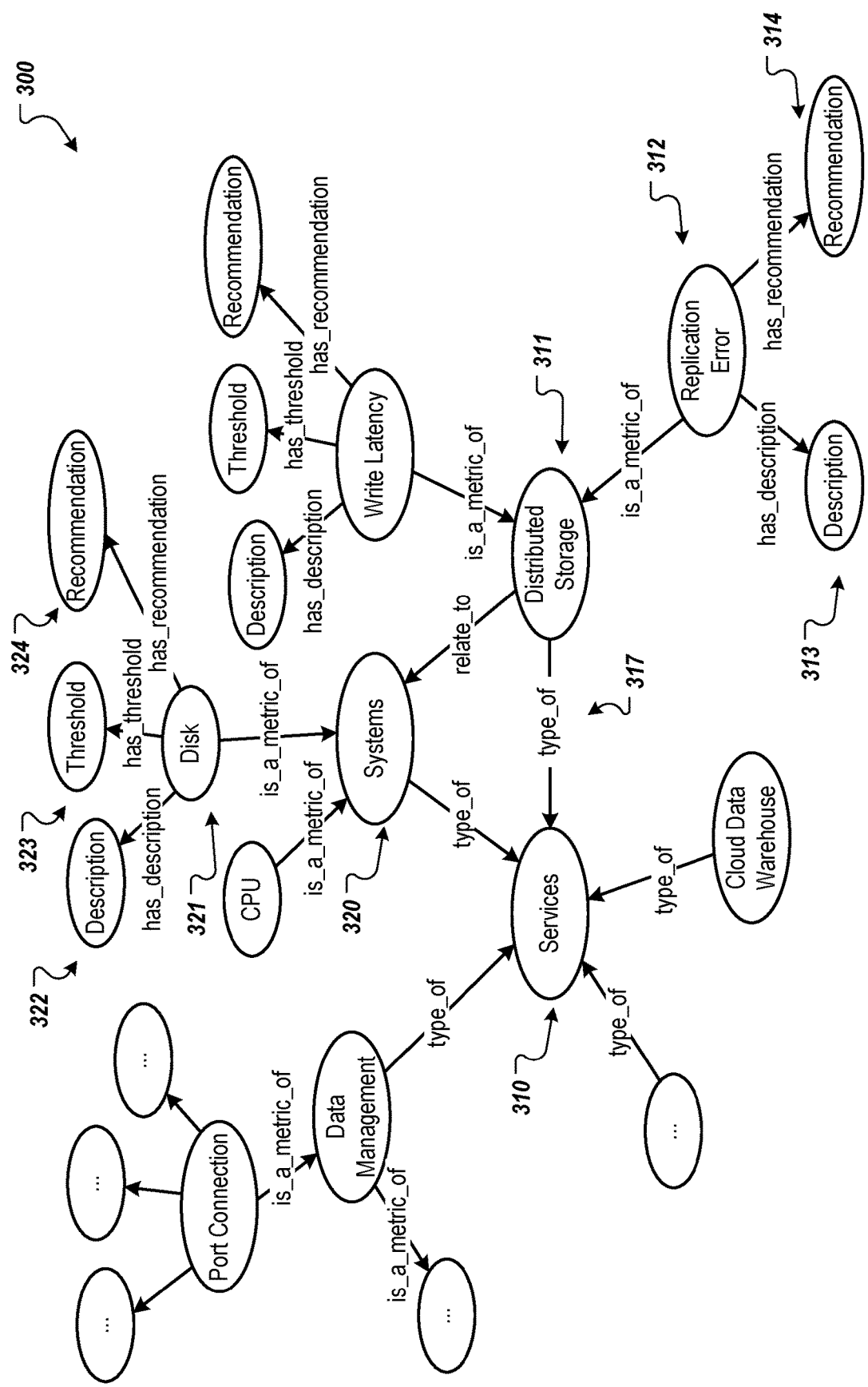
FIG. 3 shows an example knowledge graph that links performance metrics with recommendations for actions to improve the performance or mitigate conditions.

Referring to FIG. 3, FIG. 3 shows an example knowledge graph 300 that links performance metrics with recommendations for actions to improve the performance or mitigate conditions. The knowledge graph 300 includes nodes for the various components of a distributed application and its runtime environment. For example, the knowledge graph 300 includes nodes for services 310, such as a distributed storage service 311, and nodes for computing systems, such as cloud computing platforms on which the application and/or services are executed. The knowledge graph 300 also includes edges between nodes that define the relationships between the nodes. For example, the edge 317 indicates that the distributed storage service 311 is a type of service. Thus, the knowledge graph 300 can represent the relationships between all of the software services and hardware resources that are involved in the execution of a distributed application.

Each component can also have associated performance metrics that are represented as nodes in the knowledge graph 300. For example, a system 320 can have a connected node for a CPU utilization metric and a connected node 321 for a disk utilization metric. Similarly, the distributed storage service 311 can have a node 312 for replication errors. Each metric can be connected to a definition node that includes a definition of the metric, a threshold or condition node that defines when the metric corresponds to a particular condition, such as a hotspot, and/or a recommended action node that specifies an action to be performed in response to the condition, e.g., to mitigate a problem condition. For example, the disk utilization node 321 is connected to a description node 322 that includes a description of the disk and its utilization metric, a threshold node 323 that specifies one or more disk utilization thresholds that respectively correspond to conditions, and a recommendation node 324 that includes, for each condition, a recommendation action. Similarly, the replication error node 312 is connected to a description node 313 that includes a description of the replication error and a recommended action node 314 that specifies a recommended action to mitigate the replication error.

A hotspot or bottleneck can correspond to particular values or values of performance metrics that satisfy a threshold, e.g., by being less than or greater than the threshold, depending on the metric. For example, a hotspot for a computing platform can correspond to a utilization of at least one of its computing resources exceeding a threshold for that computing resource. In another example, an over capacity hotspot can be defined by a data storage service having an error or at least a threshold number of errors over a given time period and the disk utilization of a computing platform that hosts the data storage service being greater than a threshold. Each hotspot can be connected to a respective recommendation action node that specifies one or more recommended actions for responding to the detected hotspot.

Referring back to FIG. 2, the knowledge importer 208 can include an interface, e.g., a Python interface, that enable users, e.g., experts such as experienced service experts (SMEs), to import facts about services into a knowledge graph for an application. A fact can be a description of a particular metric or service, or a definition of a hotspot or bottleneck. The knowledge importer 208 can iterate each fact and insert the fact into the knowledge graph. The users, e.g., SMEs, can regularly update the knowledge graph using the interface of the knowledge importer 208. For example, if a service includes a new error, the SME for the service can update the knowledge graph to include nodes for the new error, e.g., including a description node, a threshold node, and a recommended action node. In another example, if an SME identifies a better way to mitigate a problem, the SME can update the recommended action node for that problem or add a new recommended action node to the knowledge graph.

The hotspot correlation engine 204 correlates observed performance metrics of a service or other component with hotspot definitions stored in a knowledge graph stored in the knowledge graph database 210. With the specific observed value of one or more performance metrics, the hotspot correlation engine 204 can query the knowledge graph for any potential hotspot issues. If the performance metric(s) satisfy the definition of a hotspot defined by the knowledge graph, the observed metrics can be labeled as a hotspot. The hotspot can be highlighted in the monitoring dashboard (e.g., the dashboard of FIG. 6). In addition, the applied intelligence module 144 can send a notification to a user, e.g., via e-mail, to alert the user about the hotspot.

The action recommendation engine 206 queries the knowledge graph for the recommendation action(s) corresponding to a hotspot detected by the hotspot correlation engine 204. The action recommendation engine 206 can notify a user of a recommended action, display the recommended action in a dashboard user interface, and/or initiate the recommended action automatically in response to the hotspot being detected.

During a benchmarking process, the applied intelligence module 144 receives raw metrics from registered services 202 in stage A. The registered services 202 can include the services that support the execution of a distributed application, such as web services, cloud services, databases, etc., that are registered with the framework 130. The raw metrics can include performance metrics or values for the services that can be used to compute the performance metrics.

In stage B, the hotspot correlation engine 204 queries the knowledge graph based on the metrics to determine whether the metrics correspond to a hotspot defined in the knowledge graph. In some implementations, the knowledge graph can be managed by a graph data management system. In such implementations, the hotspot correlation engine 204 can provide the metrics to the management system and the management system can compare the metrics to the thresholds defined for a hotspot. If each of the one or more thresholds for a hotspot is satisfied, the management system can respond with data identifying the hotspot.

In some implementations, the knowledge graph is managed by the applied intelligence system 144. In such examples, the hotspot correlation engine 204 can query the knowledge graph for the appropriate thresholds and make the threshold comparisons directly.

In stage C, if a hotspot is detected, the action recommendation engine 206 queries the knowledge graph for a recommended action to perform based on the detected hotspot. That is, the action recommendation engine 206 can obtain, from the knowledge graph, the data specified by the recommended action node connected to the detected hotspot.

In stage D, the applied intelligence module 144 publishes the hotspot to a dashboard user interface 212. For example, the applied intelligence module 144 can cause the framework to update a dashboard user interface 212 being displayed at a client device of a user to display information about the detected hotspot. This information can include the description of the hotspot (e.g., that is stored in the description node in the knowledge graph) and/or the recommended action.

In stage E, the applied intelligence module 144 causes the recommended action to be performed. In some implementations, the applied intelligence module 144 can initiate the action within the appropriate platform on which a service is running. For example, the applied intelligence module 144 can reconfigure the application or a service, or scale up computing resources of the platform in accordance with the recommended action.

Figure 4:
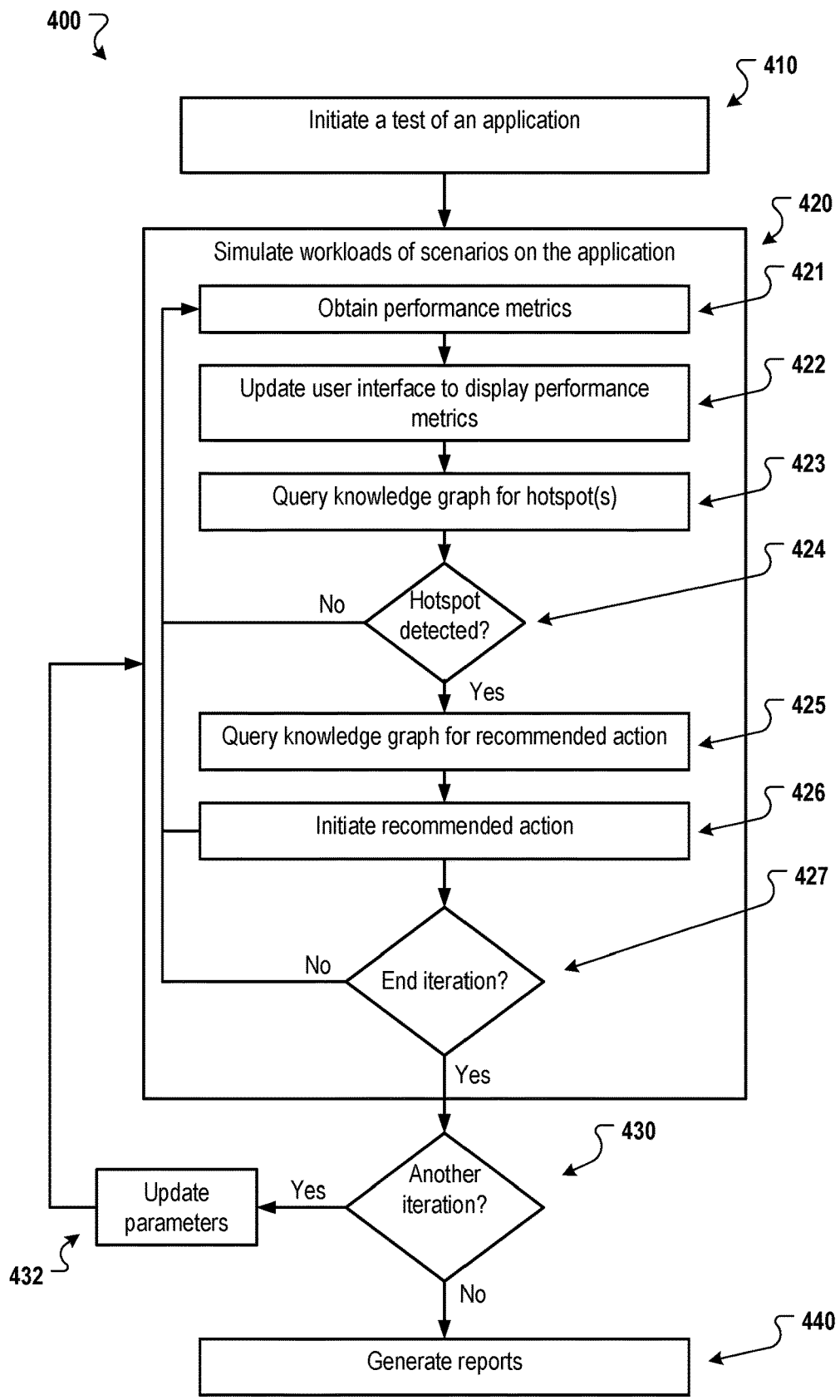
FIG. 4 is a flow diagram of an example process for improving the performance of an application.

FIG. 4 is a flow diagram of an example process 400 for improving the performance of an application. The process 400 can be implemented by the framework 130 of FIG. 1. Operations of the process 400 can also be implemented as instructions stored on non-transitory computer readable media, and execution of the instructions by one or more data processing apparatus can cause the one or more data processing apparatus to perform the operations of the process 400. For ease of description, the process 400 will be described as being performed by the framework 130.

The framework 130 initializes a test of an application (410). The test can be a benchmark test for measuring the performance of the application and the various individual software and hardware components involved in executing the application. The application can be, or include, distributed applications, a web service, a big data/cloud service, one or more databases, production dataflows, and machine learning/artificial intelligence engines.

During the test, the framework simulates a set of workload scenarios for which performance of the application is measured during the test (420). The framework 130 can simulate different types of workloads, including linear and non-linear workloads. This enables the framework 130 to perform various benchmarks, including load, stress, spike, endurance, and scalability testing. These tests help in identifying potential hotspot conditions and application thresholds in terms of concurrency, response time, and resource utilization.

During the test, the framework 130 can make dynamic adjustments to various components of the application, the services utilized by the application, and the computing resources (e.g., of cloud computing platforms) that are used to execute the application. These adjustments can be made by reconfiguring the components during the test, e.g., in response to detecting hotspots during the test. In this way, the framework 130 can adapt the application and/or runtime environment to arrive at a final software and hardware environment that performs better for the workloads being simulated.

The framework 130 can also dynamically adjust the context in which the application is executing and other parameters that can affect the performance of the application. For example, users may submit requests to an application from various different geographic regions that have different bandwidth connections to the application. To test the application's response to these different bandwidths, the framework 130 can adjust the bandwidth connection during the test to measure the performance for each of multiple different bandwidths. For example, the framework 130 can cap the network to simulate lower speeds in order to measure the performance of the application under slower network speeds.

The framework 130 can perform additional operations while testing an application. These operations include operations 421-427.

The framework 130 obtains performance metrics (421). The framework 130 can compute performance metrics for individual components, such as the application itself (or components of the application), services relied on by the application, and the computing resources. As described above, the framework 130 can also obtain performance metrics using plugins.

The framework 130 updates one or more user interfaces based on the performance metrics (422). For example, the framework 130 can provide updated performance data to a client-side application that displays the data and/or a graph based on the data. Examiner user interfaces are shown in FIGS. 6 and 7 and described below.

The framework 130 queries a knowledge graph using the performance metrics (423). This query can include data identifying the values of the performance metrics. The knowledge graph can define the relationships between the components of an application, the computing resources in which the application is executed, performance metrics of the components, and recommended actions to take based on the performance metrics. For example, the knowledge graph can link the individual components to corresponding performance metrics and can define a set of hotspot conditions that are each based on one or more of the corresponding performance metrics for the individual components.

The framework 130 determines whether a hotspot condition is detected based on the performance metrics (424). In some implementations, the framework 130 can identify a hotspot condition in a response received from a graph management system to which the query is sent. In some implementations, the framework 130 can compare the performance metrics to the definitions of the conditions in the knowledge graph to determine whether a hotspot condition is present/active.

If no hotspot condition is detected, the framework 130 can continue obtaining performance metrics and querying the knowledge graph based on the performance metrics. If a hotspot condition is detected, the framework 130 queries the knowledge graph for a recommended action (425). This query can include data identifying the detected hotspot condition. If the detected hotspot is connected to a recommended action in the knowledge graph, the framework 130 can identify the recommended action connected to the detected hotspot or receive data identifying the recommended action from a graph management system.

The recommended action can be to reconfigure, e.g., adjust one or more configuration settings of, one of the individual components. For example, the action may be to adjust the queue size of a database service. In another example, the action may be to scale up the number CPUs used to host a service.

The framework 130 initiates the recommended action (426). In some implementations, the framework 130 can initiate the action by sending a request to a computing platform that hosts the component or that uses the component to host software applications or services. If the framework 130 has the necessary permissions, the framework 130 can perform the reconfiguration itself, e.g., without sending a request.

After reconfiguring a component, the framework 130 can continue performing the test using the updated configuration. In this way, the framework 130 can dynamically adjust the runtime environment and measure the performance of the components within the updated environment.

If an action does not mitigate a hotspot condition, the framework 130 can perform additional actions. For example, a set of recommended actions for a hotspot condition can include a sequence of actions to be performed in the case that the first action does not mitigate the hotspot condition.

The actions taken during a test to reconfigure a component can be maintained during the test and after the test is completed. For example, if a computing resource is scaled up based on performance metrics measured during the test, the scaled up computing resource can be maintained for the application after the test is completed. In a particular example, if the number of cores is increased during the test to improve the performance of the application, the increased number of cores can be used to execute the application in the runtime environment after the test is completed. Similarly, if code of the application is changed during the test to improve the performance of the application, the updated code can be used for the application in the runtime environment.

The framework 130 determines whether to end a current iteration of the test (427). For example, as described above, a benchmarking test can include multiple iterations that are each performed for a particular time duration. If this time duration has lapsed, the framework 130 can determine to end the current iteration.

If the framework 130 determines to not end the iteration, the framework 130 can continue performing the test, obtaining performance metrics, querying the knowledge graph, and performing actions in response to any detected hotspots.

If the framework 130 determines to end the iteration, the framework 130 can determine whether to perform another iteration (430). If there is another iteration to perform, the framework 130 can update the settings for the next iteration (432), if any need to be updated, and perform the next iteration.

If no additional iterations are to be performed, the framework 130 can generate final reports related to the test (440). As described above, these reports can include an aggregate report and other types of reports generated based on the aggregate report.

FIG. 5 shows an example user interface 500 for submitting settings for benchmarking an application. The user interface 500 can be in the form of a web interface displayed by a web browser. In other examples, the user interface 500 can be part of an application other than a web browser.

The user interface 500 includes a benchmark setup area 510, a custom workload configuration area 520, a framework setup area 530, a recommendations area 540, and an I/O area 550. The benchmarks setup area 510 enables a user to enter/select various benchmark settings, such as the directory in which files related to the benchmarking process can be found and stored, the minimum heap size, the maximum heap size, the types of workloads to be simulated (e.g., custom, load, stress, spike or step-up), the expected peak users for the application (which can be used to simulate up to that number of users), the scenarios to be simulated (which can be in the form of a script or other code or data file), the number of runs (e.g., iterations) of the benchmarking process, and any files to upload for the benchmarking process.

The custom workload configuration area 520 enables the user to customize the workloads to be simulated during the benchmarking process. For example, the custom workload configuration area 520 enables the user to enter/select the execution type, the number(s) of concurrent users to simulate for plain scenarios, the number(s) of users to simulate for mix scenarios, the ramp-up time, the duration of each iteration of the benchmarking process, the number of loops, parameters for mix scenarios, the sleep time before each iteration of the benchmarking process, the sleep time after each iteration of the benchmarking process, the sleep time between user sets, the sleep time between scenarios, the directory for datasets used during the benchmarking process, and the required network bandwidth for the simulation. As described above, the framework 130 can test the performance of the application based on different bandwidth settings for the connection of client devices (or other devices) to the application over a network.

The framework setup area 530 enables the user to customize the framework for running the benchmark of the application. For example, the framework setup area 530 enables the user to enter/select the timestamp for the benchmarking session, whether to perform execution, whether to generate an HTML, report, whether to generated an aggregate report, whether to parse the aggregate report to generate other types of reports, whether to collect the top-K 95% requests, whether to collect the top-K average requests, the value of K, whether to enable the parse logger to process the execution logs and extract execution timestamps, the monitoring tools to enable during the benchmarking, whether to push data into an Influx database, whether to enable e-mail notifications, whether to enable recommendations of actions to perform to improve the performance of the application whether to enable a graph generator to generate graphs (e.g., of performance metrics), and whether to stop the execution of the benchmarking when the error rate is 100%.

The recommendations area 540 enables the user to specify parameters related to when and how recommendations are generated. For example, the recommendations area 540 enables the user to enter select a base request parameter, a percentage for the base request parameter, an error threshold that, when satisfied, triggers recommendations, a run selector, and an SLA parameter.

The I/O directories area 550 enables the user to specify the paths for various inputs to the framework 130 and the path to store various outputs generated by the framework 130.

FIG. 6 shows an example dashboard user interface 600 that displays performance metrics generated during the benchmarking of an application. The dashboard user interface 600 can also be displayed as a web interface. The report generator 140 of the framework 130 can generate and update the dashboard user interface 600 continuously or periodically during the benchmarking of an application. In this way, current performance metrics are displayed to the user and the user can use the metrics to identify hotspots or bottlenecks in the application or the computing resources on which the application is executed.

The dashboard user interface 600 can display performance metrics in real-time during the execution of a benchmarking process. The dashboard user interface 600 can be customizable by the user to display various performance metrics. In this example, the dashboard user interface 600 includes a summary area 610 at the top that shows the Total number of users of the application over time during the benchmarking process, the completed number of users (e.g., users that completed their sessions with the application) over time during the benchmarking process, the total number of requests handled by the application during the benchmarking process, the total number of failed requests during the benchmarking process, the success rate of the requests (which can be based on the total number of requests and the number of successful requests), and the error rate, which can be based on the total number of requests and the number of failed requests.

The dashboard user interface 600 also includes a throughput graph that shows the throughput of the application over time during the benchmarking relative to the total number of users and a metrics overview table 630 that displays an overview of performance metrics computed during the benchmarking of the application.

FIG. 7 shows an example dashboard user interface 700 that displays performance metrics generated during the benchmarking of an application. This example user interface 700 shows request-specific performance metrics that enable a user to visualize the performance of the application in handling specific types of requests. The user interface 700 includes a summary area 710 that shows the current request count, the success rate of the requests, the number of failed requests, and the error rate for the requests.

The user interface 700 also includes a response time area 720 that shows the response time metrics (e.g., minimum, maximum, and median response times) for specific requests, a latency area 730 that shows latency metrics for specific requests, and a request breakdown area 740 that shows additional information for specific requests. The user interface 700 also includes a graph area 750 that includes graphs for request-specific performance metrics, including, in this example, the throughput of specific requests, the error rate of specific requests, the 95% response time for each specific request, and the maximum response time for each specific request.

Figure 8:
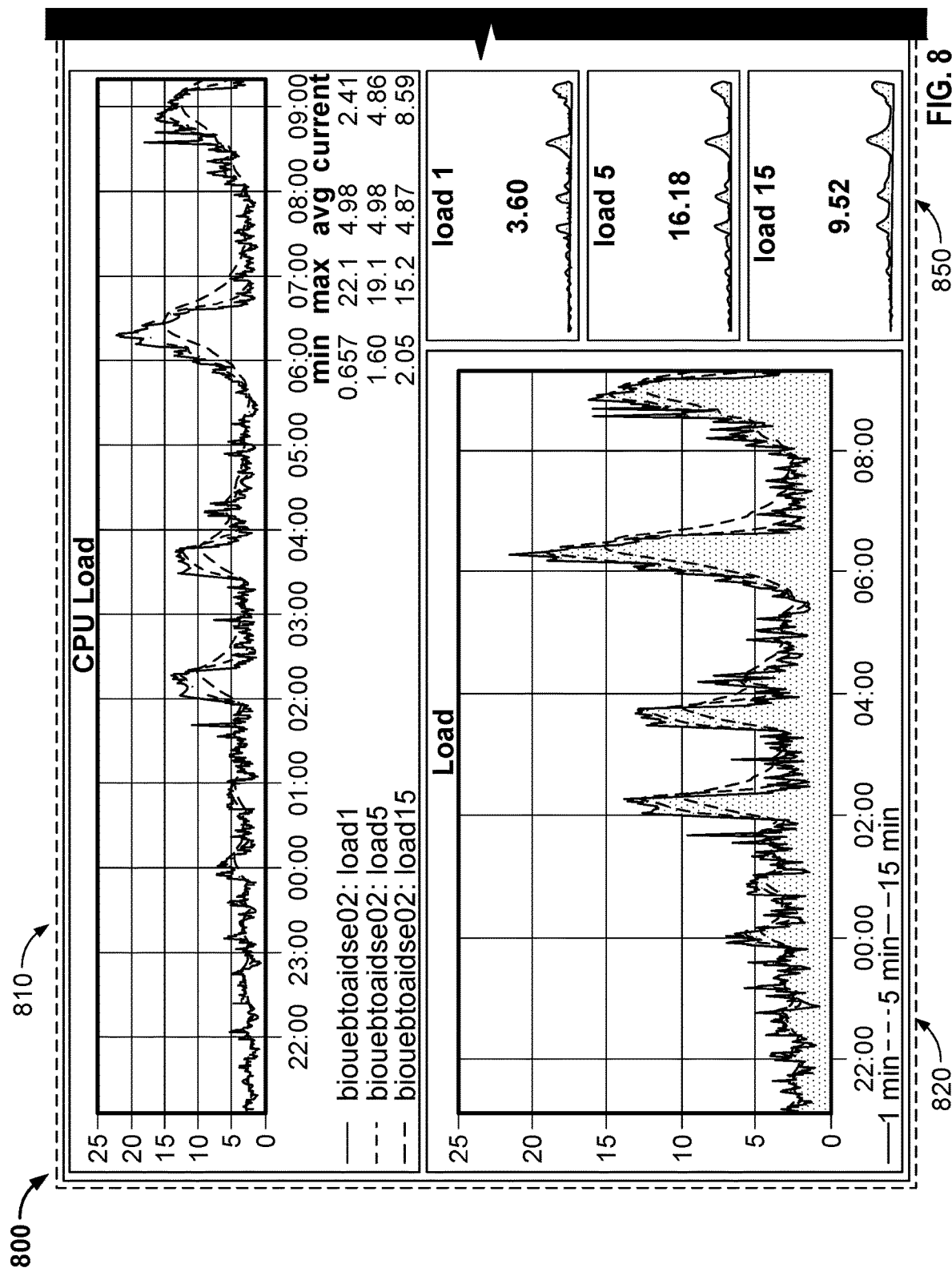
FIG. 8 shows an example user interface that displays performance metrics generated for CPUs during the benchmarking of an application.
Figure 8:
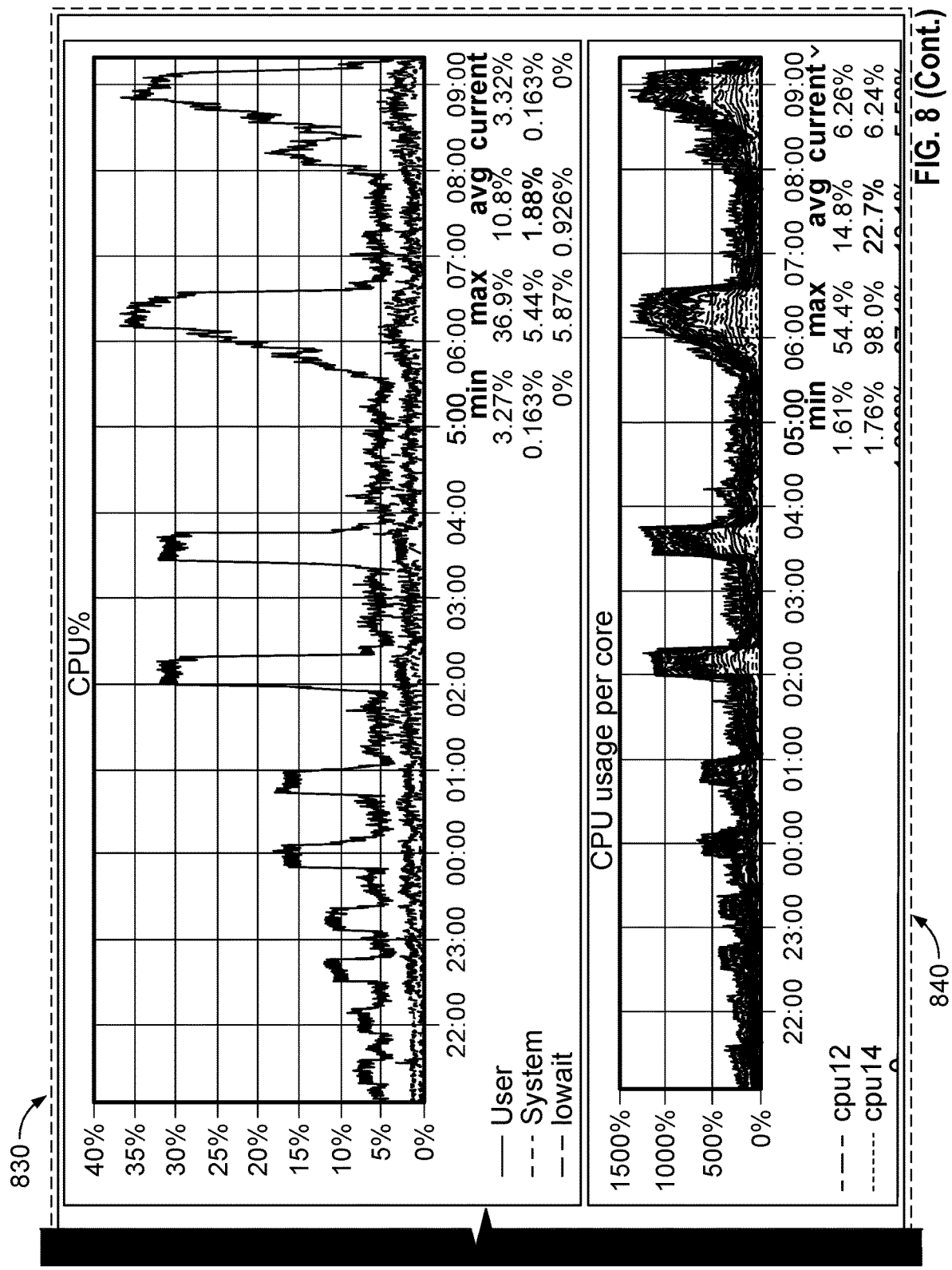

FIG. 8 shows an example user interface 800 that displays performance metrics generated for CPUs during the benchmarking of an application. In this example, the user interface 800 includes a graph 810 of the load on one or more CPUs over time and related metrics for the load (e.g., minimum, maximum, average), as well as the current load. The user interface 800 also includes a graph 820 of the workload being handled by the CPUs. The user interface 800 also includes a graph 830 of the utilization of the CPUs for various types of loads, e.g., user requests, system tasks, and I/O waits. The user interface 800 also includes a graph 840 that shows the relative CPU utilization for each core and their associated metrics (e.g., minimum, maximum, average). This enables a user to quickly identify any cores that are being over utilized and/or trending towards a hotspot condition. The user interface 800 also includes graphs 850 of the level of each of several types of loads.

Figure 9:
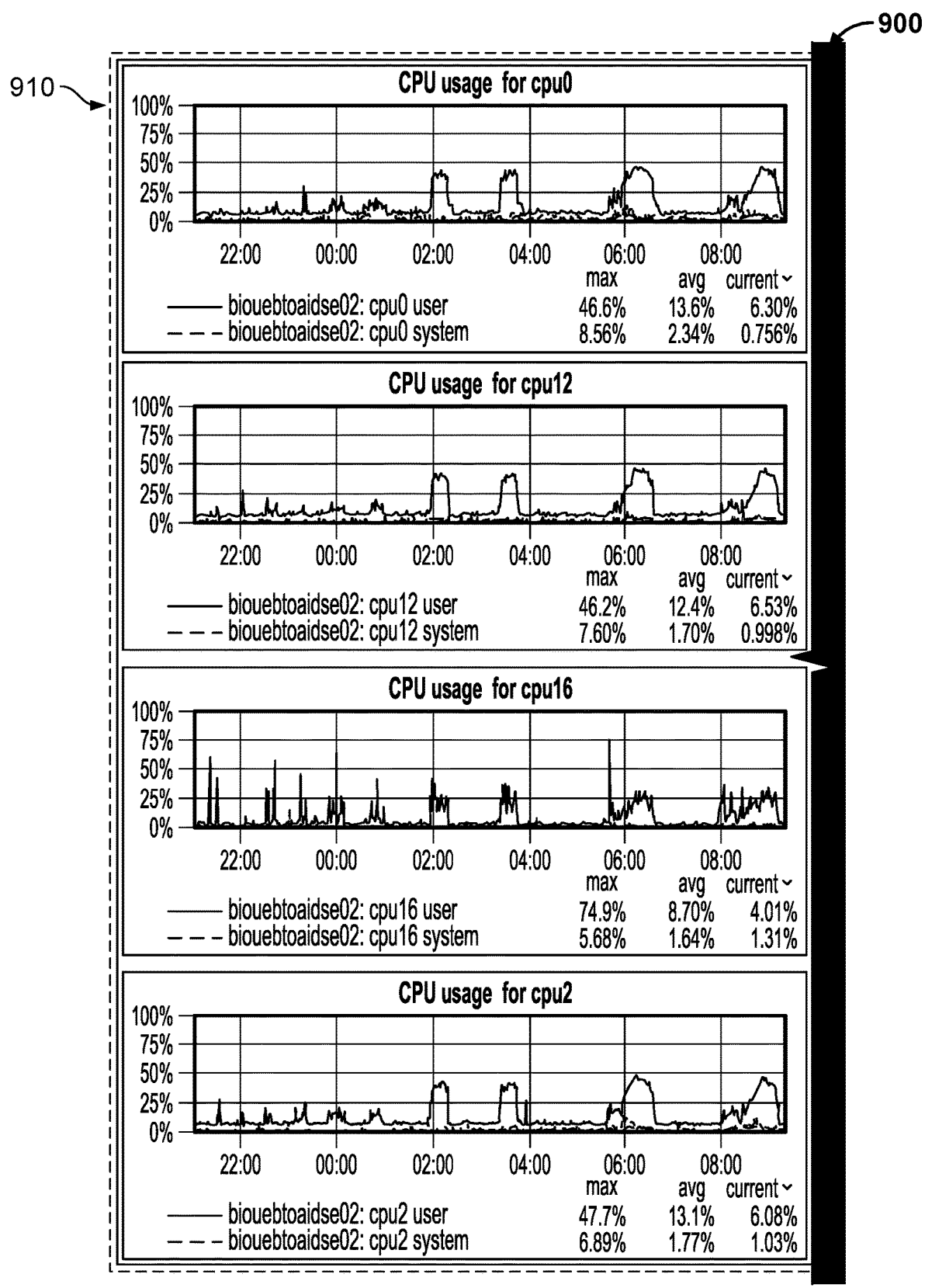
FIG. 9 shows an example user interface that displays the utilization of CPUs during the benchmarking of an application.
Figure 9:
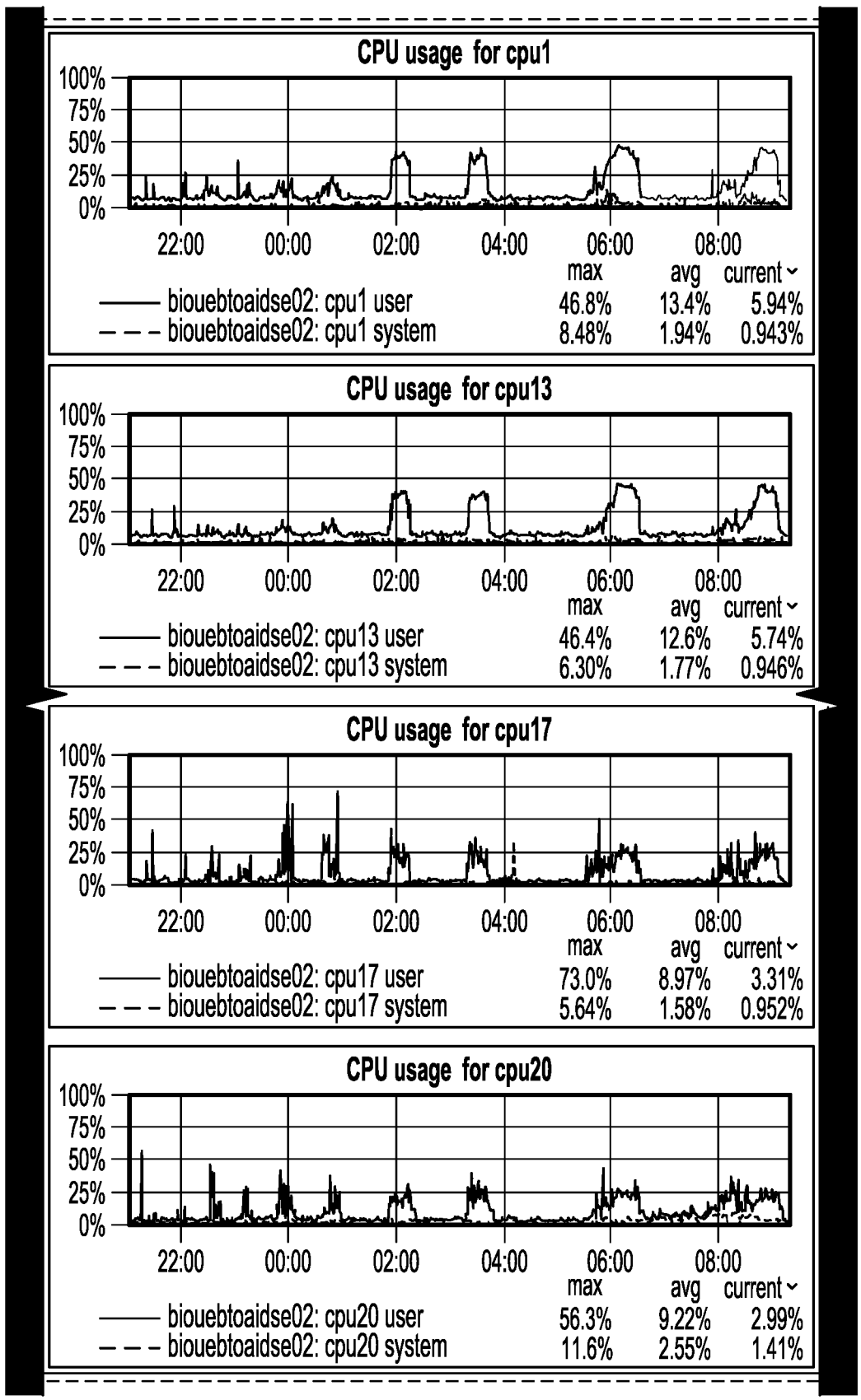
Figure 9:
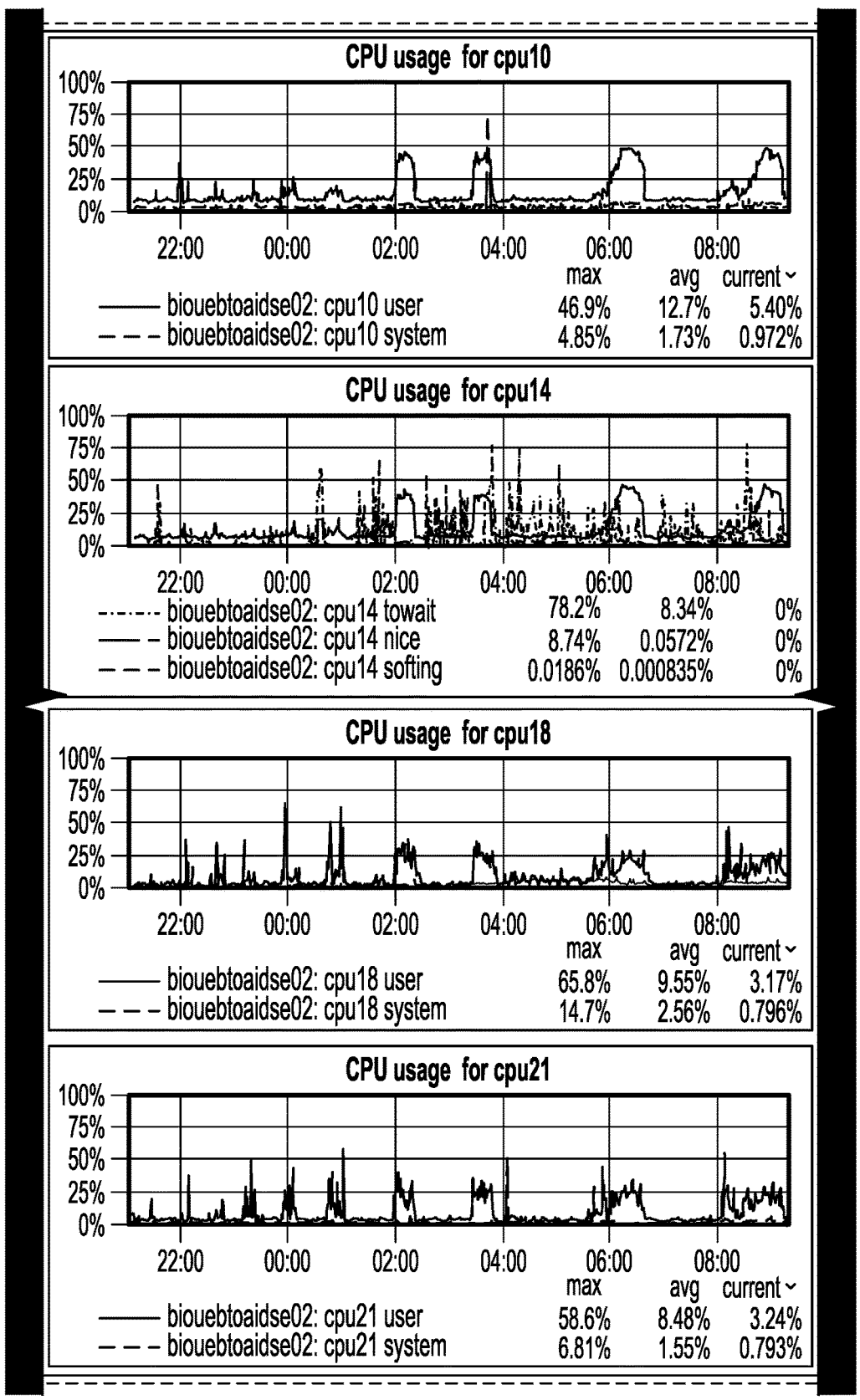
Figure 9:
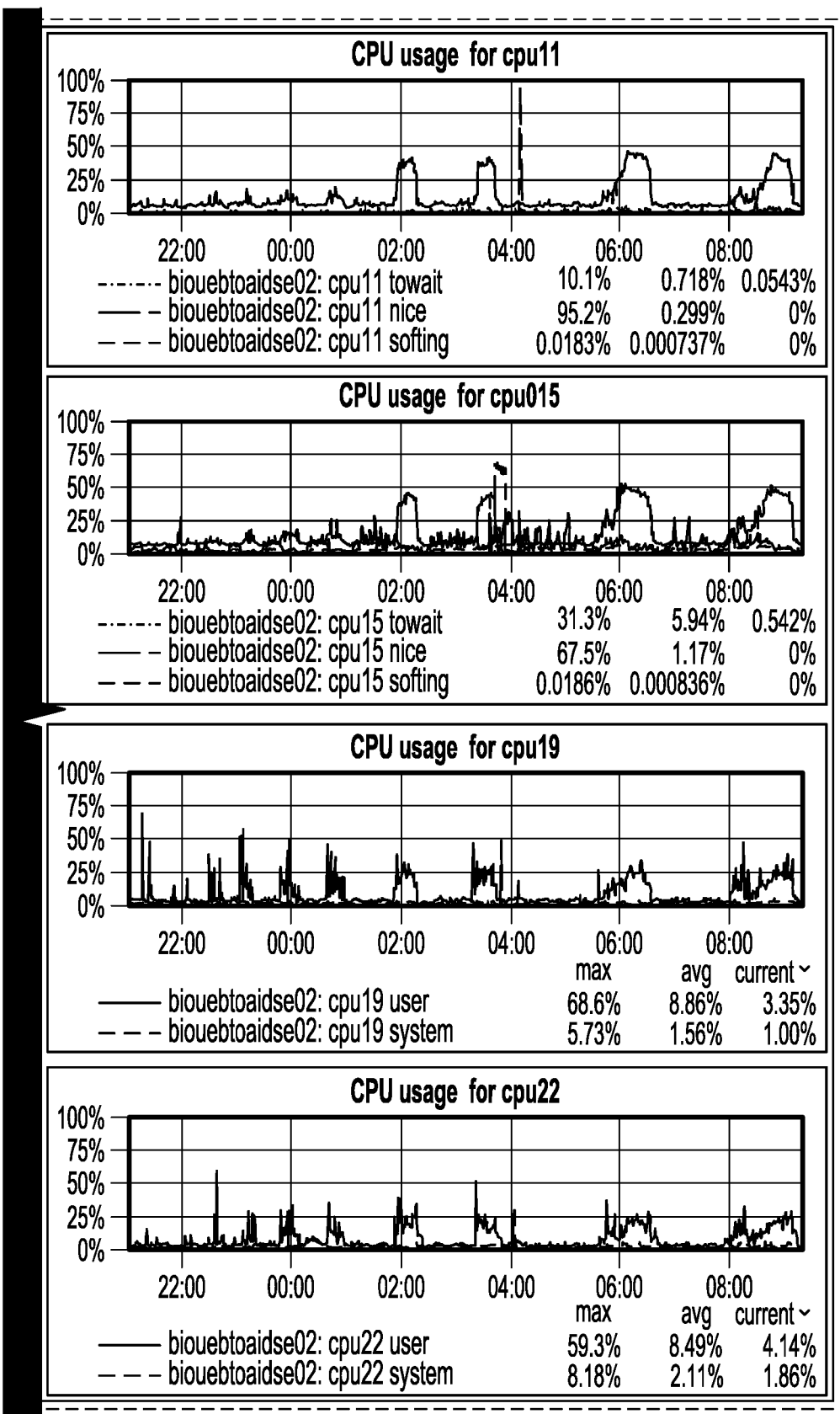

FIG. 9 shows an example user interface 900 that displays the utilization of CPUs during the benchmarking of an application. In this example, the user interface 900 includes a CPU metrics area 910 of each of multiple CPUs that are being used to execute the application and handle requests for the application during the benchmarking. Each CPU metrics area 910 includes a graph of the utilization of the CPU for different types of workloads (e.g., user and system) and performance metrics for the CPU for each type of workload (e.g., maximum and average utilization).

Figure 10:
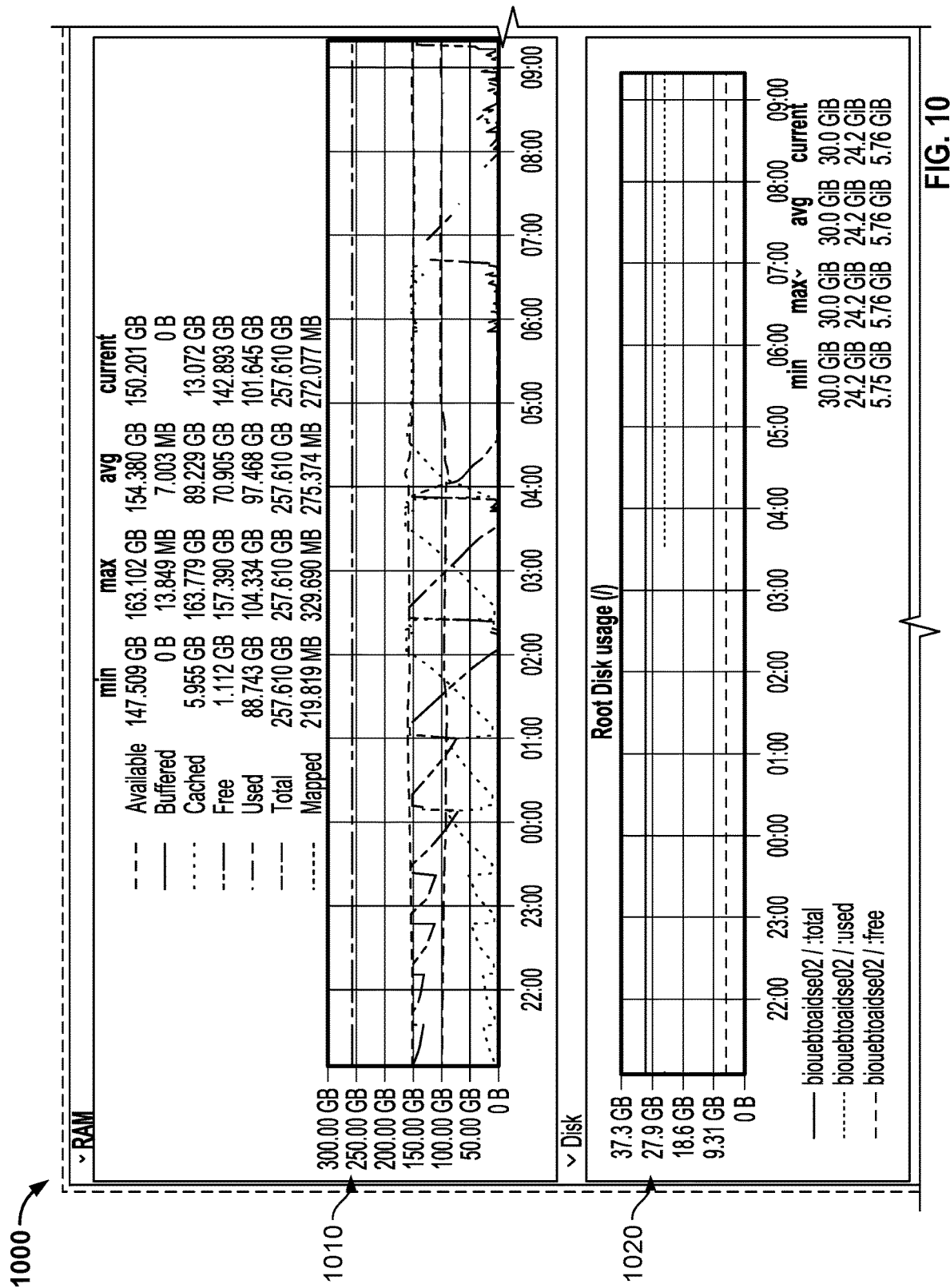
FIG. 10 shows an example user interface that displays performance metrics generated for memory and data storage during the benchmarking of an application.
Figure 10:
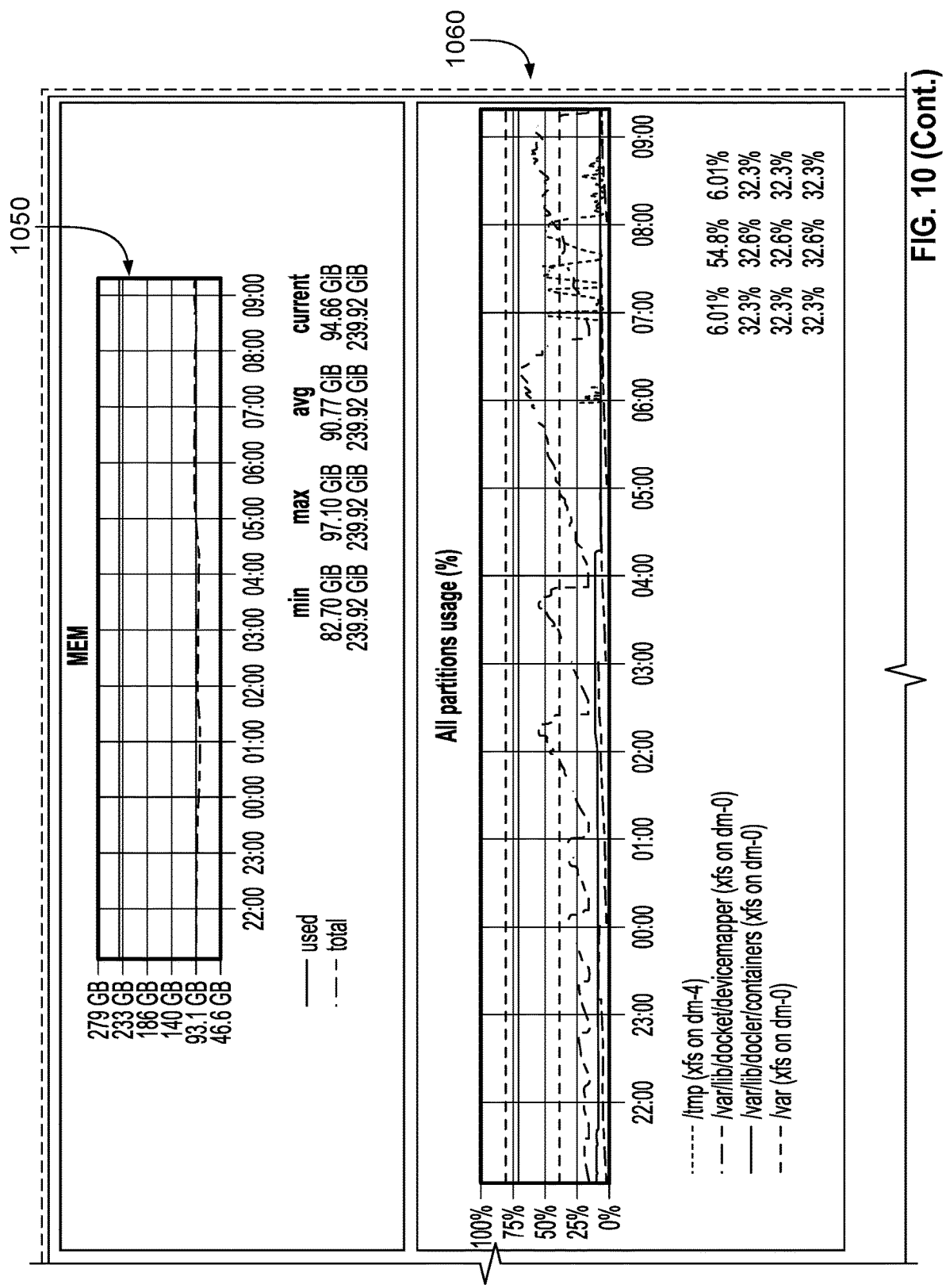

FIG. 10 shows an example user interface 1000 that displays performance metrics generated for memory and data storage during the benchmarking of an application. The user interface 1000 includes a graph 1010 that shows the utilization of RAM for the application over time during the benchmarking. For example, the graph 1010 shows the amount of available RAM, the amount of RAM used for buffering, the amount of RAM used for caching, the amount of free RAM, the amount of used RAM, the total amount of RAM, and the amount of mapped RAM. The user interface 1000 also includes metrics (e.g., minimum, maximum, and average) for each of these parameters to the right of the graph 1010.

The user interface 1000 also includes a graph 1020 that shows the total amount of root disk, the amount of root disk used, and the amount of root disk that is free over time during the benchmarking of the application. The user interface 1000 also includes graphs 1030 and 1040 that show the partitioning of disk storage over time during the benchmarking of the application. The user interface 1000 also includes a graph 1050 the amount of memory used over time during the benchmarking, graphs 1060, 1070, and 1080 that shows the usage of disk storage partitions, over time during the benchmarking of the application.

Figure 11:
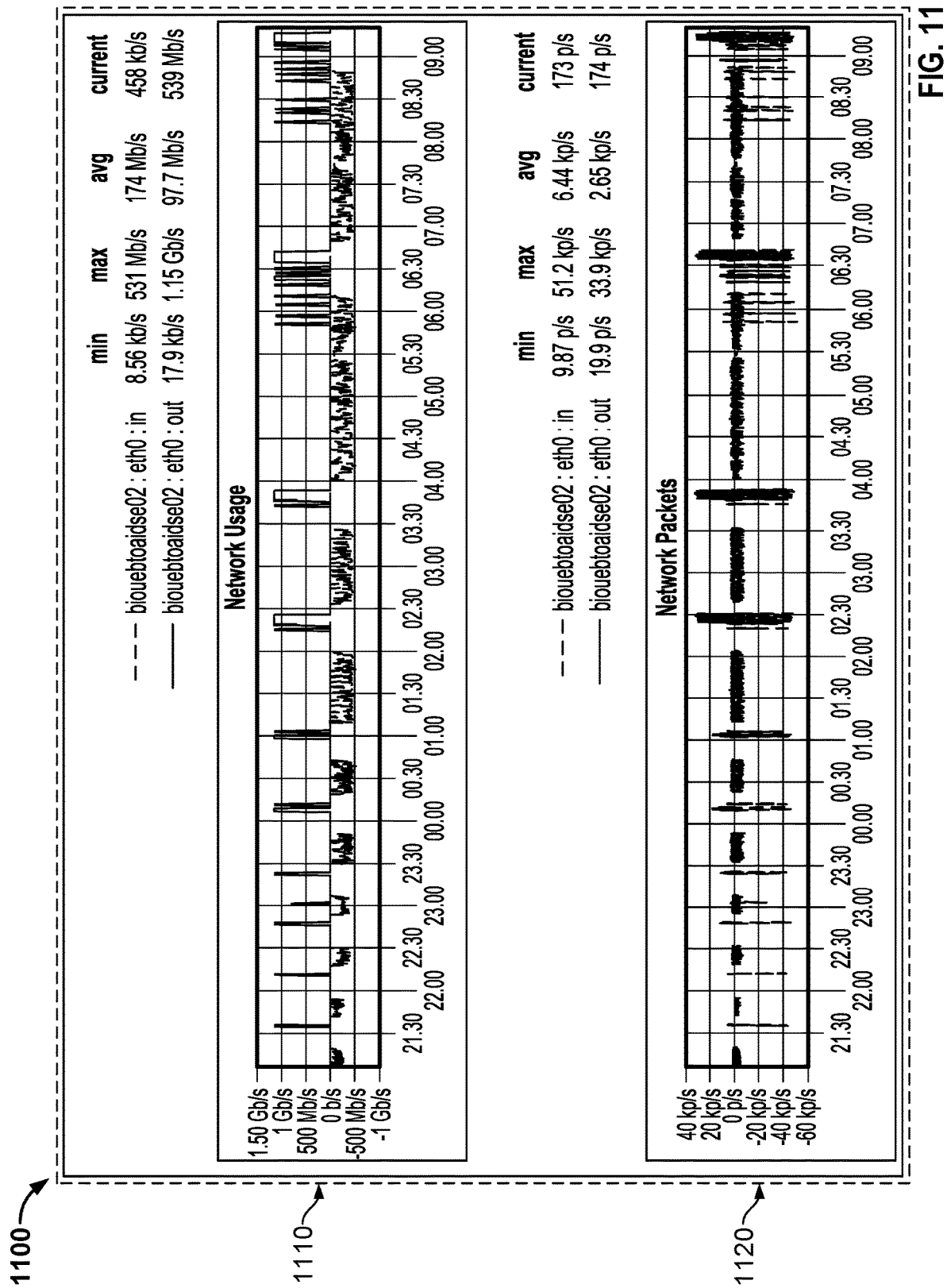
FIG. 11 shows an example user interface that displays performance metrics generated for a network during the benchmarking of an application.
Figure 11:
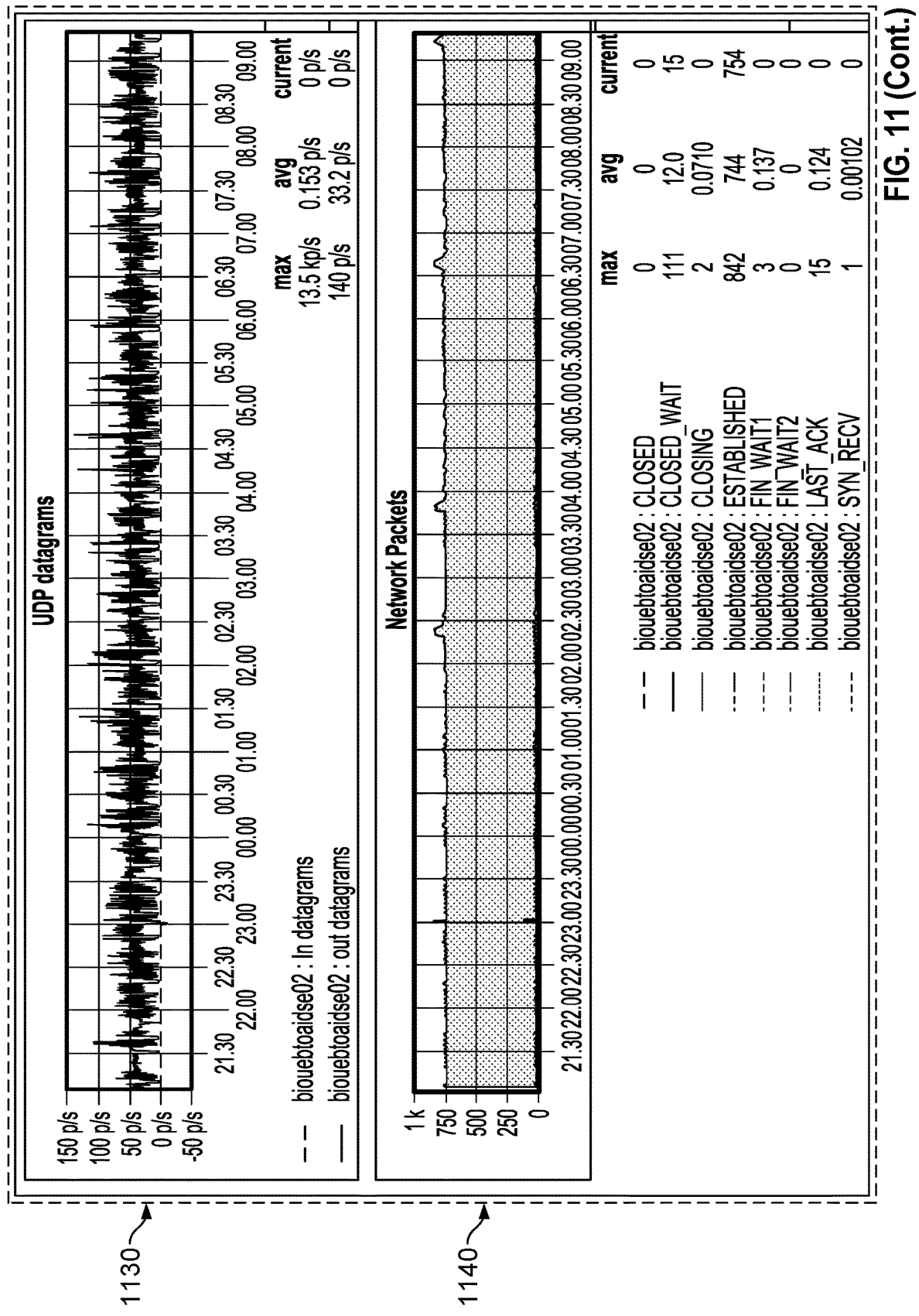

FIG. 11 shows an example user interface 1100 that displays performance metrics generated for a network during the benchmarking of an application. The performance metrics are for the network through which user requests are sent to the application, the application sends outputs, and/or the application communicates with other applications and/or services. The user interface 1100 includes a graph 1110 that shows the network usage for inputs and outputs, a graph 1120 that shows the rate of packet transmittals over the network for inputs and outputs, a graph 1130 that shows the rate of UDPs, and a graph 1140 that shows the quantity of specific network packets sent over the network during the benchmarking of the application.

Figure 12:
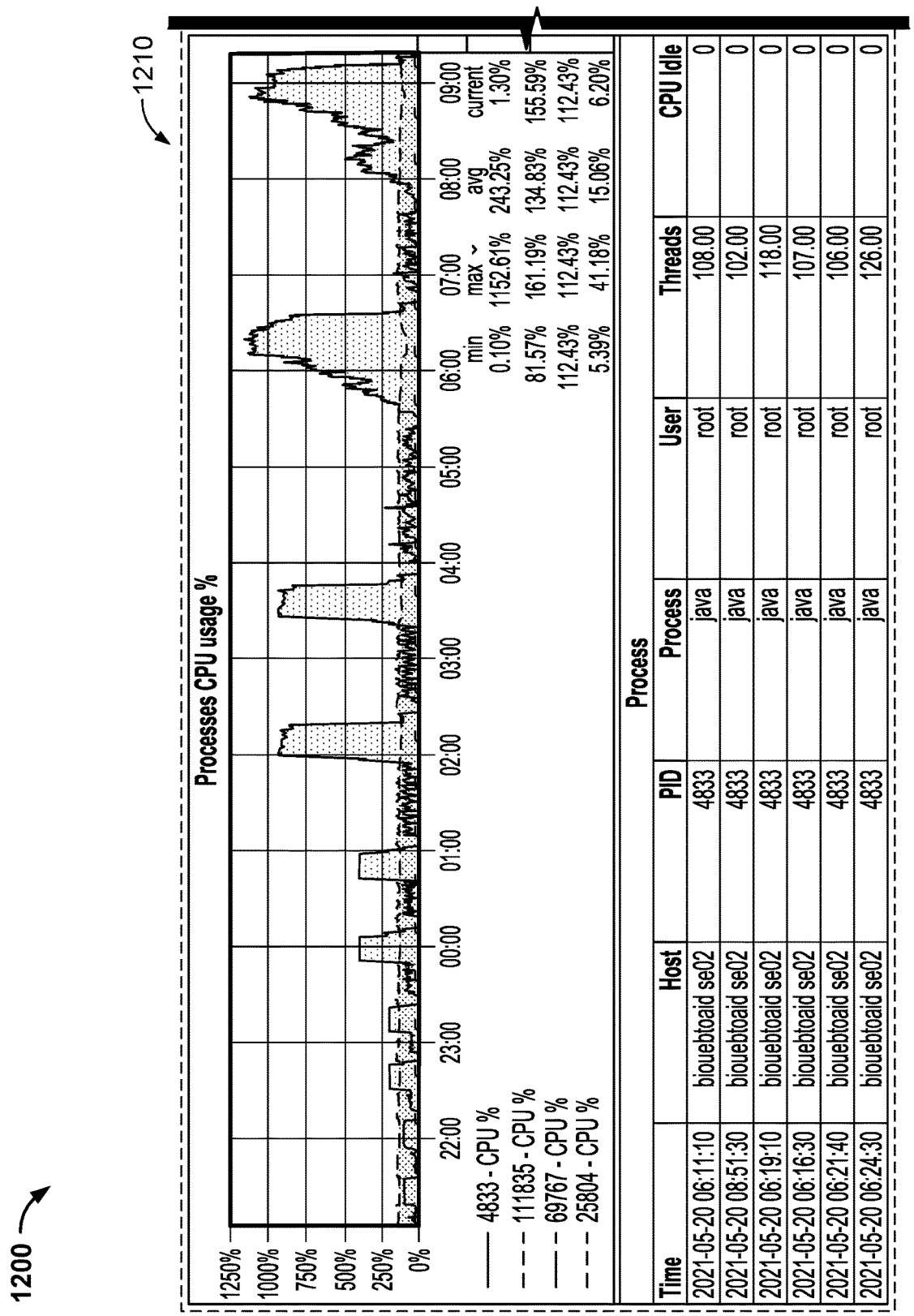
FIG. 12 shows an example user interface that displays performance metrics generated for processes during the benchmarking of an application.
Figure 12:
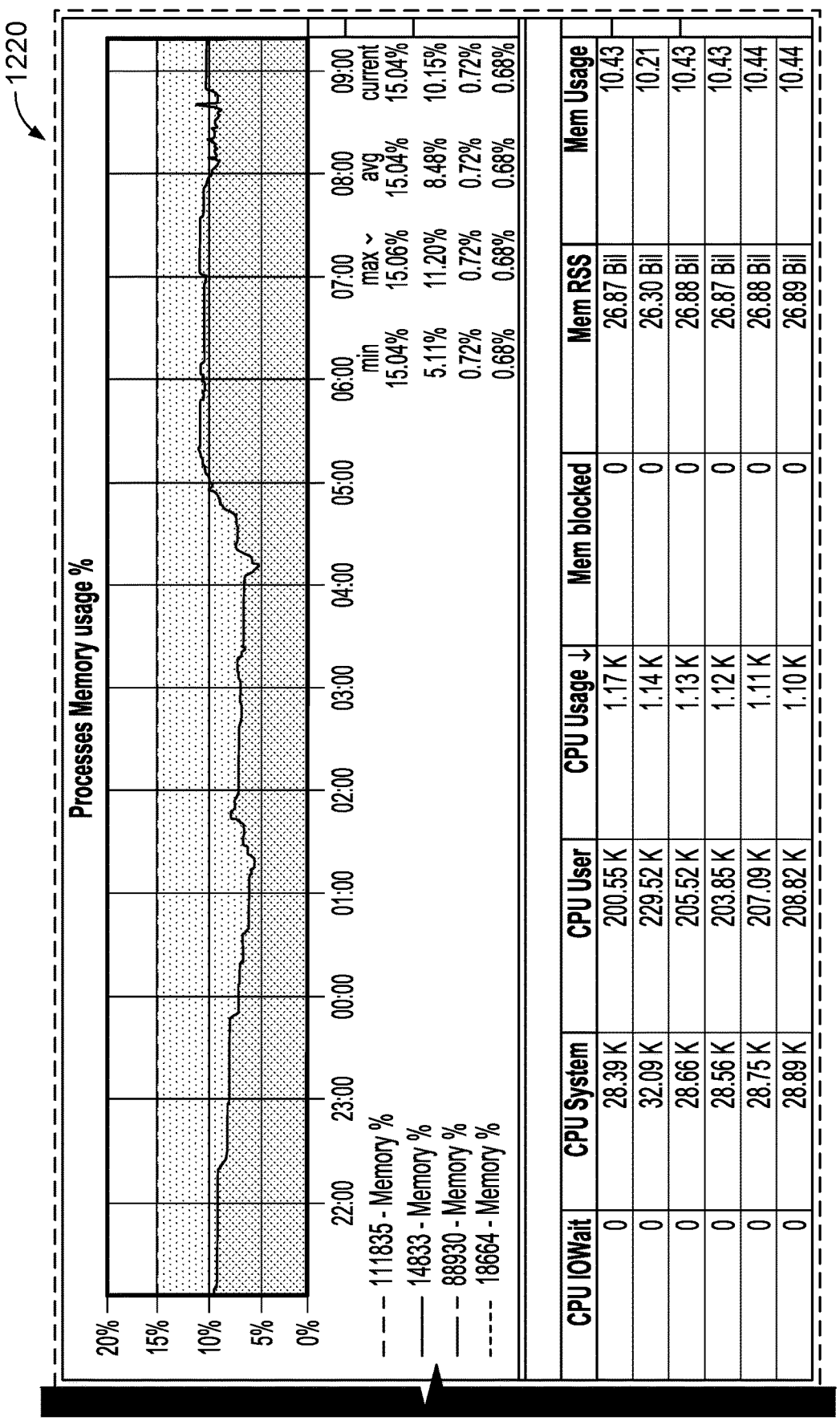

FIG. 12 shows an example user interface 1200 that displays performance metrics generated for processes during the benchmarking of an application. The user interface 1220 includes a graph 1210 of the utilization of CPUs for performing specific processes, a graph 1220 that shows the utilization of memory for the specific processes, and a table 1230 that shows performance metrics for system components for the specific processes.

The metrics shown in the user interfaces described above can be computed by and/or otherwise obtained by the framework 130, e.g., during the benchmarking of an application and/or after the benchmarking is complete. The framework 130 can generate the metrics and update the user interfaces in real time during the benchmarking of an application, which enables users to detect issues (e.g., hotspot conditions) early.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Figure 13:
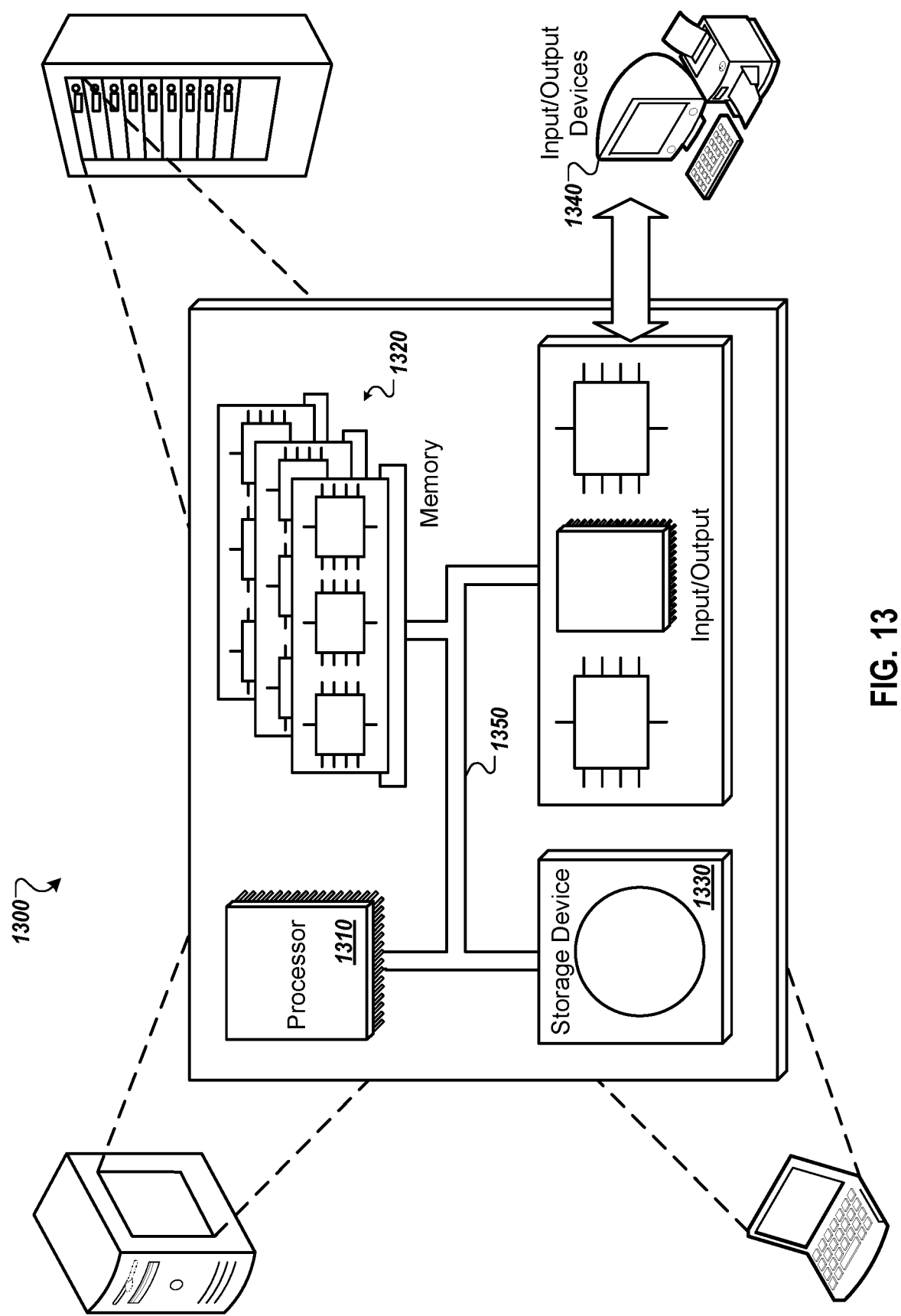
FIG. 13 is a block diagram of a computing system that can be used in connection with computer-implemented methods described in this document.

An example of one such type of computer is shown in FIG. 13, which shows a schematic diagram of a generic computer system 1300. The system 1300 can be used for the operations described in association with any of the computer-implemented methods described previously, according to one implementation. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
performing a test on an application, wherein the test comprises executing the application on one or more computers and, while executing the application, simulating a set of workload scenarios for which performance of the application is measured during the test; and
while performing the test:
obtaining a set of performance metrics that indicate performance of individual components involved in executing the application during the test, the individual components comprising the application, one or more services utilized by the application, and underlying computing resources on which the application and one or more services are executed;
querying, using the set of performance metrics, a knowledge graph that (i) comprises first nodes, each first node representing an individual component, second nodes, each second node representing a performance metric, and links, at least one link between each first node and at least one second node, and that (ii) defines a set of hotspot conditions that are each based on one or more of corresponding performance metrics for the individual components;

in response to the querying, identifying a given hotspot condition that has been detected based on the set of performance metrics; and initiating an action that reconfigures one or more individual components based on the given hotspot.

2. The computer-implemented method of claim 1, wherein initiating the action that reconfigures the one or more individual components based on the given hotspot comprises:

generating a recommendation indicating a recommended action for a given individual component; and sending the recommendation to a platform that manages the given individual component, wherein the platform adjusts a configuration of the individual component based on the recommended action and maintains the adjusted configuration after the test is completed.

3. The computer-implemented method of claim 2, wherein the given individual component is the application and the recommended action comprises an adjustment to code of the application.

4. The computer-implemented method of claim 2, wherein the given individual component comprises an underlying computing resource on which the application or a service used by the application is executed, and the recommended action comprises scaling up or scaling down the underlying computing resource for executing the application or the service.

5. The computer-implemented method of claim 1, further comprising continuing performing the test using the reconfigured one or more individual components.

6. The computer-implemented method of claim 1, wherein the knowledge graph links each hotspot condition to one or more recommended actions for responding to the hotspot condition.

7. The computer-implemented method of claim 6, wherein initiating the action comprises:

querying, using the given hotspot condition, the knowledge graph for a given recommended action linked to the given hotspot condition;

receiving, in response to the querying, the given recommended action; and initiating, as the action that reconfigures the one or more individual components, the given recommended action.

8. The computer-implemented method of claim 1, wherein performing the test comprises simulating linear and non-linear workloads.

9. The computer-implemented method of claim 1, wherein performing the test comprises adjusting a bandwidth of a network connection between client devices and the application during the test.

10. The computer-implemented method of claim 1, wherein the action reconfigures a software component of the individual components, the method further comprising:

determining that the hotspot condition remains active after performing the action;

identifying a second action that reconfigures a hardware component based on the hotspot condition; and initiating the second action.

11. The computer-implemented method of claim 10, wherein the second action comprises increasing a quantity or capacity of the hardware component.

12. The computer-implemented method of claim 1, further comprising updating, while performing the test, one or more user interfaces that display at least a subset of the set of performance metrics.

13. The computer-implemented method of claim 1, further comprising:

determining respective performance scores for a plurality of the individual components involved in executing the application during performance of the test, wherein the performance score for each individual component is based on one or more key performance indicators measured for the individual component during the test; and adjusting a configuration of at least a portion of the individual components based on the respective performance scores for the portion of the individual components.

14. The computer-implemented method of claim 13, further comprising determining an overall performance score for the application based on the respective performance scores for the plurality of individual components.

15. The computer-implemented method of claim 13, wherein adjusting the configuration of at least a portion of the individual components based on the respective performance scores for the portion of the individual components comprises adjusting the configuration of a given individual component until the respective performance score for the given individual component reaches a specified threshold.

16. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

performing a test on an application, wherein the test comprises executing the application on one or more computers and, while executing the application, simulating a set of workload scenarios for which performance of the application is measured during the test; and while performing the test:

obtaining a set of performance metrics that indicate performance of individual components involved in executing the application during the test, the individual components comprising the application, one or more services utilized by the application, and underlying computing resources on which the application and one or more services are executed;

querying, using the set of performance metrics, a knowledge graph that (i) comprises first nodes, each first node representing an individual component, second nodes, each second node representing a performance metric, and links, at least one link between each first node and at least one second node, and that (ii) defines a set of hotspot conditions that are each based on one or more of corresponding performance metrics for the individual components;

in response to the querying, identifying a given hotspot condition that has been detected based on the set of performance metrics; and initiating an action that reconfigures one or more the individual components based on the given hotspot.

17. The computer-implemented system of claim 16, wherein initiating the action that reconfigures the one or more individual components based on the given hotspot comprises:

generating a recommendation indicating a recommended action for a given individual component; and sending the recommendation to a platform that manages the given individual component, wherein the platform adjusts a configuration of the individual component based on the recommended action and maintains the adjusted configuration after the test is completed.

18. The computer-implemented method of claim 17, wherein the given individual component is the application and the recommended action comprises an adjustment to code of the application.

19. The computer-implemented method of claim 17, wherein the given individual component comprises an underlying computing resource on which the application or a service used by the application is executed, and the recommended action comprises scaling up or scaling down the underlying computing resource for executing the application or the service.

20. A non-transitory, computer-readable medium storing one or more instructions executable by a computer system to perform operations comprising:

performing a test on an application, wherein the test comprises executing the application on one or more computers and, while executing the application, simulating a set of workload scenarios for which performance of the application is measured during the test; and while performing the test:

obtaining a set of performance metrics that indicate performance of individual components involved in executing the application during the test, the individual components comprising the application, one or more services utilized by the application, and underlying computing resources on which the application and one or more services are executed;

querying, using the set of performance metrics, a knowledge graph that (i) comprises first nodes, each first node representing an individual component, second nodes, each second node representing a performance metric, and links, at least one link between each first node and at least one second node, and that (ii) defines a set of hotspot conditions that are each based on one or more of corresponding performance metrics for the individual components;

in response to the querying, identifying a given hotspot condition that has been detected based on the set of performance metrics; and initiating an action that reconfigures one or more the individual components based on the given hotspot.

* * * * *

UNITED STATES PATENT AND TRADEMARK OFFICE
CERTIFICATE OF CORRECTION

PATENT NO. : 11,709,758 B2
APPLICATION NO. : 17/360472
DATED : July 25, 2023
INVENTOR(S) : Tri Phi Minh Nguyen et al.

Page 1 of 1

It is certified that error appears in the above-identified patent and that said Letters Patent is hereby corrected as shown below:

In the Claims

Claim 18, Column 25, Line 8, delete "computer-implemented method" and insert -- computer-implemented system --.

Claim 19, Column 25, Line 12, delete "computer-implemented method" and insert -- computer-implemented system --.

Signed and Sealed this
Twenty-sixth Day of September, 2023

Katherine Kelly Vidal
*Director of the United States Patent and Trademark Office*